United States Patent
Suzuki et al.

(10) Patent No.: US 10,975,483 B2
(45) Date of Patent: Apr. 13, 2021

(54) DIAPHRAGM FOR ALKALINE WATER ELECTROLYSIS, ALKALINE WATER ELECTROLYSIS DEVICE, METHOD FOR PRODUCING HYDROGEN, AND METHOD FOR PRODUCING DIAPHRAGM FOR ALKALINE WATER ELECTROLYSIS

(71) Applicant: ASAHI KASEI KABUSHIKI KAISHA, Tokyo (JP)

(72) Inventors: Yusuke Suzuki, Tokyo (JP); Kenji Nakagawa, Tokyo (JP); Hidefumi Takami, Tokyo (JP); Norikazu Fujimoto, Tokyo (JP)

(73) Assignee: ASAHI KASEI KABUSHIKI KAISHA, Tokyo (JP)

( * ) Notice: Subject to any disclaimer, the term of this patent is extended or adjusted under 35 U.S.C. 154(b) by 27 days.

(21) Appl. No.: 15/558,861

(22) PCT Filed: Mar. 18, 2016

(86) PCT No.: PCT/JP2016/058873
§ 371 (c)(1),
(2) Date: Sep. 15, 2017

(87) PCT Pub. No.: WO2016/148302
PCT Pub. Date: Sep. 22, 2016

(65) Prior Publication Data
US 2018/0073155 A1    Mar. 15, 2018

(30) Foreign Application Priority Data

Mar. 18, 2015  (JP) .............................. JP2015-054517

(51) Int. Cl.
*C25B 13/08*  (2006.01)
*B29C 48/00*  (2019.01)
(Continued)

(52) U.S. Cl.
CPC .............. *C25B 13/08* (2013.01); *B05D 3/108* (2013.01); *B29B 7/90* (2013.01); *B29C 48/0011* (2019.02);
(Continued)

(58) Field of Classification Search
CPC ........... C25B 1/10; C25B 13/00; C25B 13/02; C25B 13/04; C25B 13/08
See application file for complete search history.

(56) References Cited

U.S. PATENT DOCUMENTS 4,224,130 A * 9/1980 Moreno ..................... C25B 1/46
204/252
4,311,566 A * 1/1982 McCann ................. C25B 13/08
204/252

(Continued)

FOREIGN PATENT DOCUMENTS

EP    0 241 995    10/1987
FR    2546535      11/1984
(Continued)

OTHER PUBLICATIONS

Machine translation of WO 2013/183584 A1 (Year: 2019).*

(Continued)

*Primary Examiner* — Alexander W Keeling
(74) *Attorney, Agent, or Firm* — Greenblum & Bernstein, P.L.C.

(57) ABSTRACT

The diaphragm for alkaline water electrolysis according to the present invention comprises a porous polymer membrane, the porous polymer membrane comprising a polymer resin and hydrophilic inorganic particles. A porosity of the porous polymer membrane is 30% or more and 60% or less, average pore sizes at both surfaces of the porous polymer membrane is 0.5 μm or more and 2.0 μm or less, and a ratio of a mode particle size of the hydrophilic inorganic particles (Continued)

to the average pore size of the porous polymer membrane (mode particle size/average pore size) is 2.0 or more.

16 Claims, 1 Drawing Sheet

(51) Int. Cl.
| | | |
|---|---|---|
| *B29C 48/88* | (2019.01) | |
| *B05D 3/10* | (2006.01) | |
| *B29B 7/90* | (2006.01) | |
| *B29C 71/00* | (2006.01) | |
| *C25B 9/08* | (2006.01) | |
| *C25B 1/10* | (2006.01) | |
| *C25B 11/04* | (2006.01) | |
| *B29K 105/16* | (2006.01) | |
| *B29L 31/00* | (2006.01) | |

(52) U.S. Cl.
CPC ........ *B29C 48/0018* (2019.02); *B29C 48/911* (2019.02); *B29C 71/0009* (2013.01); *C25B 1/10* (2013.01); *C25B 9/08* (2013.01); *C25B 11/0415* (2013.01); *B29C 2071/0036* (2013.01); *B29K 2105/16* (2013.01); *B29K 2995/0092* (2013.01); *B29L 2031/755* (2013.01); *Y02E 60/36* (2013.01)

(56) References Cited

U.S. PATENT DOCUMENTS

| | | |
|---|---|---|
| 4,604,170 A | 8/1986 | Haruhisa et al. |
| 2011/0111122 A1 | 5/2011 | Mues et al. |
| 2011/0178193 A1 | 7/2011 | Iruya et al. |
| 2011/0293976 A1 | 12/2011 | Chiba et al. |
| 2015/0064606 A1 * | 3/2015 | Dekempeneer ..... H01M 8/0656 429/516 |
| 2018/0073155 A1 | 3/2018 | Suzuki et al. |

FOREIGN PATENT DOCUMENTS

| | | |
|---|---|---|
| JP | 59-166541 | 9/1984 |
| JP | 61-130347 | 6/1986 |
| JP | 62-199629 | 9/1987 |
| JP | 2002-505506 | 2/2002 |
| JP | 2005-314593 A | 11/2005 |
| JP | 2006-169457 A | 6/2006 |
| JP | 2007-280918 | 10/2007 |
| JP | 2009-185333 | 8/2009 |
| JP | 2009-269941 A | 11/2009 |
| JP | 2011-25110 A | 2/2011 |
| JP | 2011-525417 A | 2/2011 |
| JP | 2011-138761 | 7/2011 |
| JP | 2011-225659 A | 11/2011 |
| JP | 2011-228188 | 11/2011 |
| JP | 2013-28822 A1 | 2/2013 |
| JP | 2013-204146 | 10/2013 |
| JP | 2014-129563 | 7/2014 |
| JP | 2015-117417 | 6/2015 |
| JP | S64-11631 | 10/2018 |
| WO | 93/15529 | 8/1993 |
| WO | 99/44245 | 9/1999 |
| WO | 2010/044425 A1 | 4/2010 |
| WO | 2013/183584 | 12/2013 |
| WO | WO-2013183584 A1 * | 12/2013 ............. C25B 13/08 |

OTHER PUBLICATIONS

Official Communication issued in European Patent Office (EPO) Patent Application No. 16765131.4, dated Jan. 9, 2018.
International Prelimiary Report on Patentabilityissued in PCT/JP2016/058873 and English translation thereof, dated Sep. 19, 2017.
Search Report issued in PCT/JP2016/058873 and English translation thereof, dated Jun. 14, 2016.
PH. Vermeiren et al., "The influence of manufacturing parameters on the properties of macroporous Zirfon separators", J Porous Mater, 2008, 15:259-264, published online Dec. 14, 2006.
PH. Vermeiren et al., The influence of manufacturing parameters on the properties of macroporous Zirfon separators (Journal of Porous Materials), 2008, vol. 15, p. 259-264.
C.A. Smolders et al., Microstructures in phase inversion membranes. Part 1. Formation of macrovoids, Journl of Membrane Science), 1992, vol. 73, p. 259-275.
Concise International Chemical Assessment Document No. 35 N-methyl-2-pyrrolidone, 2001, p. 8-10, and partial translation as indicated.
Handbook of Chemistry Pure Chemistry II Revised, 5th Edition edited by the Chemical Society of Japan, 2004, II-149~II-159, and partial translation as indicated.

* cited by examiner

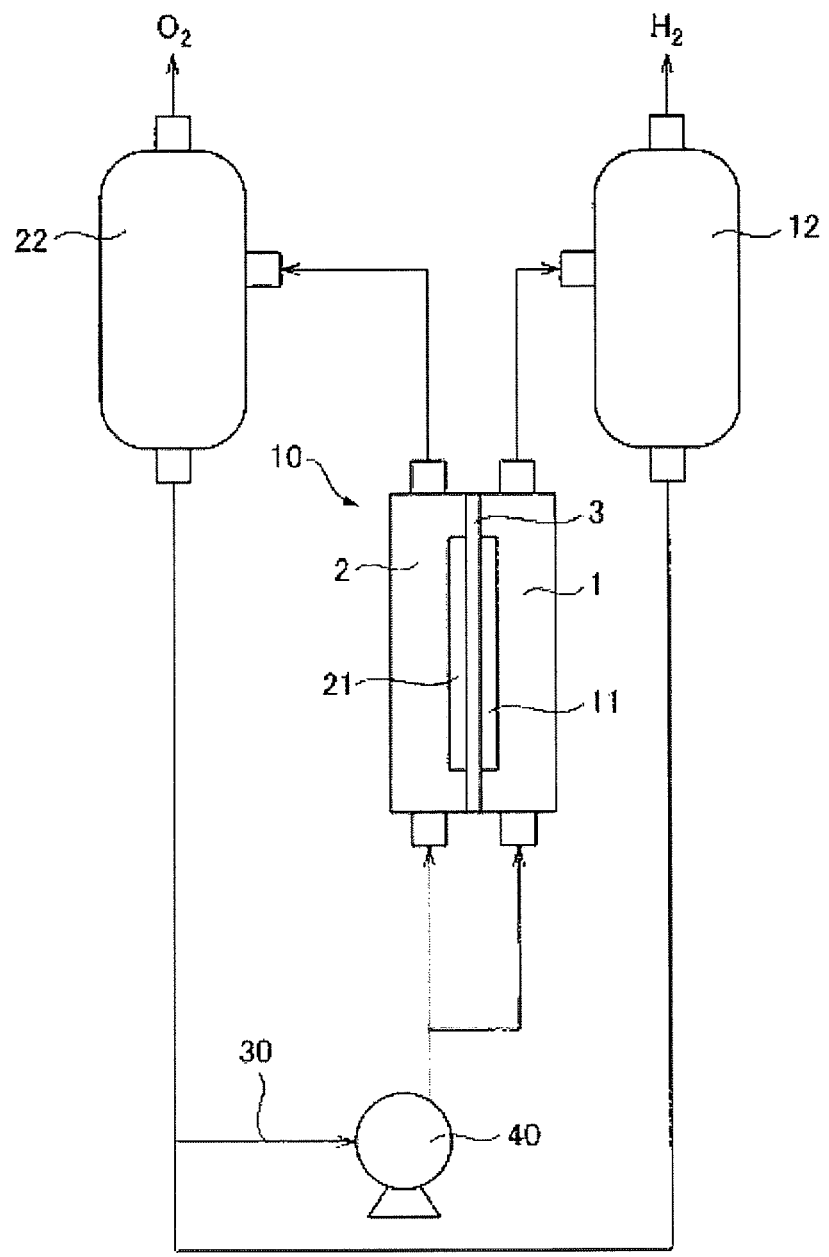

DIAPHRAGM FOR ALKALINE WATER ELECTROLYSIS, ALKALINE WATER ELECTROLYSIS DEVICE, METHOD FOR PRODUCING HYDROGEN, AND METHOD FOR PRODUCING DIAPHRAGM FOR ALKALINE WATER ELECTROLYSIS

TECHNICAL FIELD

The present invention relates to a diaphragm for alkaline water electrolysis, an alkaline water electrolysis device, a method for producing hydrogen, and a method for producing a diaphragm for alkaline water electrolysis.

BACKGROUND ART

Hydrogen has been used in a wide variety of industrial applications such as in petroleum refining, chemical synthesis materials, metal refining, and stationary fuel cells. Nowadays, the use of hydrogen is expected to grow in hydrogen stations for fuel cell vehicles (FCV), smart communities, and hydrogen power plants. In addition, the increasing trend towards introduction of renewable energy has made it necessary to maintain the balance between supply and demand in power grids and accordingly enhanced the need for hydrogen storage which allows long-term storage of a large amount of electricity. In view of this, attention is being focused on techniques for producing high-purity hydrogen.

One industrial method for producing hydrogen is water electrolysis process. This process has the advantage of being capable of producing higher purity hydrogen than methods for producing hydrogen by modification of fossil fuel. For water electrolysis process, an aqueous solution containing an electrolyte such as sodium hydroxide or potassium hydroxide is generally used as an electrolyte solution to obtain increased electrical conductivity. Applying direct-current electricity to this electrolyte solution by means of a cathode and an anode induces water electrolysis process.

An electrolytic cell used for electrolysis process (which hereinafter may be simply referred to as "electrolysis") is divided by a diaphragm into an anode compartment and a cathode compartment. In the anode compartment there is produced oxygen gas, while in the cathode compartment there is produced hydrogen gas. The diaphragm is required to have gas impermeability to prevent mixing of the oxygen gas and hydrogen gas.

In water electrolysis process, ions act as carriers of electricity (electrons). The diaphragm is therefore required to have high ion permeability to allow the electrolysis process to take place efficiently. From this viewpoint, diaphragms having a porous structure have been studied as diaphragms that exhibit high ion permeability.

To allow the electrolysis process to take place efficiently, reduction in solution resistance among the anode, cathode, and diaphragm is also desired. From this viewpoint, it is considered preferable to sandwich the diaphragm between the two electrodes.

As for technical solutions related to diaphragms, Patent Literatures 1 and 4 each disclose a diaphragm for alkaline water electrolysis that is a porous membrane formed by incorporating zirconium oxide or magnesium oxide into polysulfone which is an aromatic polymer resin and carrying out a non-solvent-induced phase separation process. In addition, Patent Literatures 2 and 3 each disclose a diaphragm for alkaline water electrolysis whose pore size is controlled to vary in the thickness direction of the diaphragm.

CITATION LIST

Patent Literature

Patent Literature 1
  International Publication No. WO 93/15529
Patent Literature 2
  Japanese Patent Laid-Open No. 2013-204146
Patent Literature 3
  Japanese Patent Laid-Open No. 2014-129563
Patent Literature 4
  French Patent Publication No. 2546535

SUMMARY OF INVENTION

Technical Problem

However, the above technical solutions still leave room for improvement. For example, when a diaphragm in the form of a porous membrane structure is sandwiched between electrodes (an anode and a cathode), hydrogen and oxygen evolved from the electrodes attach in the form of gas bubbles to the surfaces of the porous membrane and close the pores in the surfaces of the porous membrane. This causes an increase in voltage loss due to the diaphragm during electrolysis, since ions cannot permeate through the pores closed with gas bubbles. This problem of voltage loss increase is considerably significant if the surfaces of the porous membrane are hydrophobic, because in this case gas bubbles readily attach to the surfaces.

When electrolysis is performed using electricity produced by means of a renewable energy source such as wind power or solar light (such a situation hereinafter may be simply referred to as "in a variable power supply environment), the amount of electricity produced varies depending on the season or time period, so that the volume of gas evolved constantly changes. At the same time, the internal pressures of the anode compartment and cathode compartment also vary, and so does the difference between a pressure acting on the anode side of the diaphragm and a pressure acting on the cathode side of the diaphragm (differential pressure). Thus, the diaphragm is required to be capable of maintaining its form to ensure stable electrolysis performance even under pressure variation during electrolysis using a variable power supply.

In the case of electrolysis performed using a porous membrane holding hydrophilic inorganic particles in its pores, the hydrophilic inorganic particles are detached from the pores as the electrolysis is continued, with the result that the number of the hydrophilic inorganic particles on the surfaces of the porous membrane decreases. The present inventors have found that this eliminates the hydrophilicity from the surfaces of the porous membrane, thus allowing gas bubbles to attach to the surfaces of the porous membrane and hinder permeation of ions.

During electrolysis, the electrolyte solution circulates in the electrolytic cell, and thus a liquid stream runs also over the surfaces of the porous membrane. In addition, during the electrolysis operation, the components such as the porous membrane vibrate in the electrolytic cell due to the gas evolution from the anode and cathode. In particular, in the case of the above-mentioned electrolysis under variable differential pressure, the differential pressure produces a liquid stream passing through the diaphragm, so that the detachment of hydrophilic inorganic particles is considerably significant. Prior art as disclosed in Patent Literatures 1 to 4 has failed to provide a diaphragm capable, when exposed to an external force such as a liquid stream or vibration, of keeping hydrophilic inorganic particles from being detached from the surfaces of a porous membrane and capable of maintaining high hydrophilicity and ion permeability during electrolysis for a long period of time.

The present invention has been made in view of the above problems, and has as its object to provide a diaphragm for alkaline water electrolysis that has good gas impermeability, that maintains hydrophilicity in long-term electrolysis, and that is free from deterioration of ion permeability caused by bubble attachment. Another object of the present invention is to provide a diaphragm for alkaline water electrolysis that is capable, in a variable power supply environment, of keeping hydrophilic inorganic particles from being detached and thus maintaining low voltage loss and good gas impermeability.

Solution to Problem

As a result of intensive studies aimed at solving the above problems, the present inventors have completed the present invention on the basis of the finding that a diaphragm for alkaline water electrolysis comprising a porous polymer membrane comprising a polymer resin and hydrophilic inorganic particles can be a solution to the above problems when the average pore sizes at the surfaces of the porous polymer membrane and the ratio of the mode particle size of the hydrophilic inorganic particles to the average pore size (mode particle size/average pore size) are adjusted to specific ranges or when the value of a bubble point measured under predetermined condition is adjusted to a specific range.

That is, the present invention is as follows.

[1] A diaphragm for alkaline water electrolysis, comprising a porous polymer membrane, the porous polymer membrane comprising a polymer resin and hydrophilic inorganic particles, wherein
 a porosity of the porous polymer membrane is 30% or more and 60% or less,
 average pore sizes at both surfaces of the porous polymer membrane is 0.5 µm or more and 2.0 µm or less, and
 a ratio of a mode particle size of the hydrophilic inorganic particles to the average pore size of the porous polymer membrane (mode particle size/average pore size) is 2.0 or more.

[2] A diaphragm for alkaline water electrolysis, comprising a porous polymer membrane, the porous polymer membrane comprising a polymer resin and hydrophilic inorganic particles, wherein
 a porosity of the porous polymer membrane is 30% or more and 60% or less, and
 bubble points of the porous polymer membrane before and after a cavitation test employing ultrasonic cleaning at a frequency of 40 kHz and a sound pressure of 190 db for 60 minutes as measured at 90° C. are 100 kPa or more.

[3] The diaphragm for alkaline water electrolysis according to [2], wherein
 average pore sizes at both surfaces of the porous polymer membrane is 0.5 µm or more and 2.0 µm or less, and
 a ratio of a mode particle size of the hydrophilic inorganic particles to the average pore size of the porous polymer membrane (mode particle size/average pore size) is 2.0 or more.

[4] The diaphragm for alkaline water electrolysis according to [2] or [3], wherein abundances of the hydrophilic inorganic particles as calculated by particle analysis are 10% or more at both surfaces of the porous polymer membrane before and after the cavitation test.

[5] The diaphragm for alkaline water electrolysis according to any of [2] to [4], wherein abundances of the hydrophilic inorganic particles as calculated by particle analysis are 10% or more at a cross-section of the porous polymer membrane before and after the cavitation test.

[6] The diaphragm for alkaline water electrolysis according to [4] or [5], wherein a ratio of decrease, caused by the cavitation test, in the abundances of the hydrophilic inorganic particles at both surfaces or a cross-section of the porous polymer membrane is less than 0.20.

[7] The diaphragm for alkaline water electrolysis according to any of [1] to [6], wherein the polymer resin comprises at least one selected from the group consisting of polysulfone, polyethersulfone, and polyphenylsulfone.

[8] The diaphragm for alkaline water electrolysis according to any of [1] to [7], wherein a thickness of the porous polymer membrane is 300 µm or more and 600 µm or less.

[9] The diaphragm for alkaline water electrolysis according to any of [1] to [8], wherein the hydrophilic inorganic particles comprise zirconium oxide.

[10] The diaphragm for alkaline water electrolysis according to any of [1] to [9], further comprising a porous support.

[11] The diaphragm for alkaline water electrolysis according to [10], wherein the porous support is any one selected from the group consisting of a mesh, a non-woven fabric, a woven fabric, and a composite fabric comprising a non-woven fabric and a woven fabric enclosed in the non-woven fabric.

[12] The diaphragm for alkaline water electrolysis according to [10] or [11], wherein the porous support comprises polyphenylene sulfide.

[13] An alkaline water electrolysis device comprising:
 an anode;
 a cathode; and
 the diaphragm for alkaline water electrolysis according to any of [1] to [12], the diaphragm being placed between the anode and the cathode.

[14] A method for producing hydrogen, comprising the step of electrolyzing alkaline water by applying a voltage to the alkaline water electrolysis device according to [13] using a variable power supply.

[15] A method for producing the diaphragm for alkaline water electrolysis according to any of [1] to [12], comprising the steps of:
 (A) preparing a solution containing the polymer resin, a solvent capable of dissolving the polymer resin, and the hydrophilic inorganic particles;
 (B) applying the solution to a substrate to form a coating on the substrate;
 (C) exposing a surface of the coating, said surface being located opposite from the substrate, to a gas containing vapor of a poor solvent for the polymer resin; and
 (D) immersing the coating on the substrate in a coagulation bath containing a poor solvent for the polymer resin to form a porous polymer membrane.

[16] The method for producing the diaphragm for alkaline water electrolysis according to [15], wherein the poor solvent in the coagulation bath further comprises the solvent.

[17] The method for producing the diaphragm for alkaline water electrolysis according to [15] or [16], wherein a concentration of a solvent in the coagulation bath is 30 to 70 mass %.

[18] The method for producing the diaphragm for alkaline water electrolysis according to any of [15] to [17], wherein the solvent comprises N-methyl-2-pyrrolidone.

[19] A method for producing the diaphragm for alkaline water electrolysis according to any of [1] to [12], comprising the steps of:

(E) mixing the polymer resin, a solvent capable of dissolving the polymer resin, and the hydrophilic inorganic particles to obtain a homogeneous dispersion, at a temperature higher than a phase separation temperature of the dispersion to be obtained;

(F) extruding the dispersion at a temperature higher than the phase separation temperature of the dispersion to obtain an extrudate;

(G) cooling the extrudate obtained in the step (F) to a temperature equal to or lower than the phase separation temperature of the dispersion to coagulate the extrudate; and (H) extracting the solvent from the extrudate obtained in the step (G) to obtain a porous polymer membrane.

[20] The method for producing the diaphragm for alkaline water electrolysis according to [19], further comprising a stretching step.

[21] A method for producing the diaphragm for alkaline water electrolysis according to any of [1] to [12], comprising the steps of:

(I) paste-extruding a mixture containing a polymer resin and hydrophilic inorganic particles;

(J) rolling the extruded paste to obtain a sheet-shaped porous membrane; and (K) stretching the obtained sheet-shaped porous membrane in a longitudinal direction and/or a transverse direction.

Advantageous Effect of Invention

According to the present invention, it is possible to provide a diaphragm for alkaline water electrolysis that has good gas impermeability, that maintains hydrophilicity in long-term electrolysis, that is resistant to deterioration of ion permeability caused by bubble attachment, and that is capable, in a variable power supply environment, of keeping hydrophilic inorganic particles from being detached and thus maintaining low voltage loss and good gas impermeability.

BRIEF DESCRIPTION OF DRAWING

FIG. 1 is a schematic diagram of an alkaline water electrolysis device fabricated in the example.

DESCRIPTION OF EMBODIMENTS

An embodiment of the present invention (which will hereinafter be referred to as "present embodiment") will now be described in detail. The present invention is not limited to the present embodiment described below, and can be carried out with various modifications falling within the gist of the present invention.

A diaphragm for alkaline water electrolysis (which hereinafter may be simply referred to as "diaphragm") of the present embodiment comprises a porous polymer membrane comprising a polymer resin and hydrophilic inorganic particles and, in the diaphragm for alkaline water electrolysis, the porosity of the porous polymer membrane is 30% or more and 60% or less, the average pore sizes at both surfaces of the porous polymer membrane are 0.5 µm or more and 2.0 µm or less, and the ratio of the mode particle size of the hydrophilic inorganic particles to the average pore size of the porous polymer membrane (mode particle size/average pore size) is 2.0 or more.

With these features, the diaphragm for alkaline water electrolysis of the present embodiment has good gas impermeability, maintains hydrophilicity in long-term electrolysis, and is resistant to deterioration of ion permeability caused by bubble attachment. In addition, in a variable power supply environment, the hydrophilic inorganic particles are kept from being detached and remain held in the diaphragm for alkaline water electrolysis, so that low voltage loss and good gas impermeability can be maintained.

A diaphragm for alkaline water electrolysis according to another aspect of the present embodiment comprises a porous polymer membrane comprising a polymer resin and hydrophilic inorganic particles and, in the diaphragm for alkaline water electrolysis, the porosity of the porous polymer membrane is 30% or more and 60% or less, and bubble points before and after a cavitation test employing ultrasonic cleaning at a frequency of 40 kHz and a sound pressure of 190 dB for 60 minutes as measured at 90° C. are 100 kPa or more.

The diaphragm for alkaline water electrolysis which has the above features also has good gas impermeability, maintains hydrophilicity in long-term electrolysis, is resistant to deterioration of ion permeability caused by bubble attachment, and is capable, in a variable power supply environment, of keeping the hydrophilic inorganic particles from being detached and thus maintaining low voltage loss and good gas impermeability.

One possible way to attain the diaphragm for alkaline water electrolysis according to the other aspect of the present embodiment is to employ the features of the diaphragm described first. Namely, it is preferable that in the diaphragm for alkaline water electrolysis according to the other aspect, the average pore sizes at both surfaces of the porous polymer membrane be 0.5 µm or more and 2.0 µm or less, and the ratio of the mode particle size of the hydrophilic inorganic particles to the average pore size of the porous polymer membrane (mode particle size/average pore size) be 2.0 or more.

(Porous Polymer Membrane)

In the present embodiment, the porous polymer membrane is a porous membrane comprising a polymer resin and hydrophilic inorganic particles, and the presence of the hydrophilic inorganic particles imparts hydrophilicity to the porous membrane. Examples of the polymer resin include, but are not limited to, polysulfone, polyethersulfone, polyphenylsulfone, polyvinylidene fluoride, polycarbonate, tetrafluoroethylene-perfluoroalkyl vinyl ether copolymer, tetrafluoroethylene-ethylene copolymer, polyvinylidene fluoride, polytetrafluoroethylene, perfluorosulfonic acid, perfluorocarboxylic acid, polyethylene, polypropylene, polyphenylene sulfide, polyparaphenylene benzobisoxazole, polyketone, polyimide, and polyetherimide. Polyphenylene copolymer and polyether ether ketone may also be used. Among these, polysulfone, polyethersulfone, and polyphenylsulfone are preferred, and more preferred is polysulfone. These may be used alone or in combination of two or more thereof.

It is preferable for the polymer resin to include at least one selected from the group consisting of polysulfone, polyethersulfone, and polyphenylsulfone, because in this case the resistance to high-temperature, high-concentration alkaline solutions tends to be increased. In addition, the diaphragm of the present embodiment can easily be produced, for example, by employing a process such as nonsolvent-induced phase separation. In particular, the use of polysulfone tends to allow the pore size to be precisely controlled.

Polysulfone, polyethersulfone, and polyphenylsulfone have a SO2 group in their structure, and the electron withdrawing ability of the SO2 group allows them to have a strong resonance structure. In addition, since they have in their structure no ester or amide which is easily degradable, they have good chemical stability and exhibit considerably high resistance to high-temperature, high-concentration alkaline solutions.

The weight-average molecular weight of polysulfone, polyethersulfone, and polyphenylsulfone is preferably such that their polystyrene-equivalent weight-average molecular weight is 40000 or more and 150000 or less. With the weight-average molecular weight being 40000 or more, deterioration of the physical properties such as mechanical strength tends to be more effectively prevented when the molecular weight decreases due to degradation. With the weight-average molecular weight being 150000 or less, viscosity increase of a solution for membrane formation can be effectively limited when the solution is prepared by dissolving the polymer resin in a solvent and dispersing the hydrophilic inorganic particles in the polymer resin solution. This tends to result in more effective prevention of formation of unevenness of application of the solution for membrane formation.

Polysulfone, polyethersulfone, and polyphenylsulfone may be cross-linked. The weight-average molecular weight of the cross-linked polysulfone, polyethersulfone, and polyphenylsulfone is preferably such that the polystyrene-equivalent weight-average molecular weight is 40000 or more and 150000 or less. Examples of the method for cross-linking include, but are not limited to: cross-linking by means of irradiation with a radioactive ray such as an electron beam or γ-ray; and thermal cross-linking using a cross-linker.

As the above-described resins there can be used commercially-available products. Examples of polysulfone include, but are not limited to, "Ultrason S PSU™" available from BASF and "Udel™" available from Solvay Advanced Polymers L.L.C. Examples of polyethersulfone include, but are not limited to: "Ultrason E PES™" available from BASF; and "Veradel™" and "Radel A™" available from Solvay Advanced Polymers L.L.C. Examples of polyphenylsulfone include, but are not limited to, "Ultrason P PPSU™" available from BASF and "Radel R™" available from Solvay Advanced Polymers L.L.C.

(Pore Size of Porous Polymer Membrane)

To achieve desired membrane properties such as high separation capacity and strength, the pore sizes at both surfaces of the porous polymer membrane of the present embodiment must be controlled. That is, the pore size must be controlled so that the diaphragm for alkaline water electrolysis prevents mixing of oxygen gas evolved from the anode and hydrogen gas evolved from the cathode and also causes less voltage loss during electrolysis. "Both surfaces" as described herein refer to the two surfaces of the porous polymer membrane which face the anode and cathode, respectively. The pore size is controlled on the basis of the average pore size described later. The larger the average pore size of the porous polymer membrane is, the better the ion permeability of the porous polymer membrane is, and the lower the voltage loss tends to be. In addition, an increase in the average pore size of the porous polymer membrane provides a decrease in surface area of contact with the electrolyte solution, which tends to reduce degradation of the polymer resin. The smaller the average pore size of the porous polymer membrane is, the higher the separation performance of the porous polymer membrane is, and the better the gas impermeability of the diaphragm for alkaline water electrolysis tends to be. Additionally, secondary particles resulting from aggregation of small-size hydrophilic inorganic particles described later can be securely held and kept from detachment. High ability to hold hydrophilic inorganic particles can thus be achieved to allow the particles to exert their effect over a long period of time.

The average pore sizes at both surfaces of the porous polymer membrane of the present embodiment is 0.5 μm or more and 2.0 μm or less. Controlling the average pore size of the porous polymer membrane within the above range results in low voltage loss and high gas impermeability. At the same time, high ability to hold hydrophilic inorganic particles can be achieved to allow the particles to exert their effect over a long period of time. From these viewpoints, the average pore size of the porous polymer membrane is preferably 0.7 μm or more and 1.5 μm or less and more preferably 0.8 μm or more and 1.2 μm or less. The average pore size of the porous polymer membrane is preferably controlled depending on a temperature range where the membrane is actually used.

The average pore sizes at both surfaces of the porous polymer membrane of the present embodiment can be measured by the procedure described below using a scanning electron microscope (SEM). The average pore sizes at both surfaces of the porous polymer membrane is measured at ordinary temperature. An image of each surface is captured with the magnification adjusted so that 100 to 400 pores present in the observed surface are seen in the measurement field of view, and the image is stored. The obtained image is binarized using an image analysis software ("WinROOF" available from MITANI CORPORATION), and the number-average of absolute maximum lengths of the respective observed pores, being 0.5 or more, is calculated. The arithmetic average of the calculated values is determined as the average pore size at the surface of the porous membrane. In the measurement using a SEM, the membrane is observed in a direction perpendicular to the surface to be observed. The "pore" is defined herein to mean an opening which is continuously surrounded by the resin. An opening a part of which falls outside the measurement field of view is not considered as a "pore".

For purposes such as preventing the hydrophilic inorganic particles from being detached from the pores of the surfaces of the porous polymer membrane when electrolysis is conducted for a long period of time, the pore size at both surfaces of the porous polymer membrane is controlled. During electrolysis, for example, the electrolyte solution circulates in the electrolytic cell, and thus a liquid stream runs over the surfaces of the porous polymer membrane. In addition, the components in the electrolytic cell, such as the porous polymer membrane, vibrate due to evolution of gasses (such as hydrogen gas and oxygen gas) from the electrodes. In the case of conducting electrolysis employing a renewable energy source, which is accompanied with output variation, the volume of gas evolved and the internal pressures of the two electrode compartments fluctuate with the output variation, so that a pressure difference that can vary (this pressure difference may hereinafter be simply referred to as "variable differential pressure") is produced between both surfaces of the porous polymer membrane. As electrolysis continues, the hydrophilic inorganic particles in the porous polymer membrane are gradually detached from the porous polymer membrane due to the vibration mentioned above or the electrolyte solution that permeates through the porous polymer membrane by the differential pressure, and thus, the content of the hydrophilic inorganic particles decreases. This results in a decrease in hydrophilicity of the surfaces of the porous polymer membrane. The decrease in hydrophilicity makes it easier for non-polar gas bubbles (such as bubbles of hydrogen gas and oxygen gas) to attach to the surfaces of the porous polymer membrane, thus causing inhibition of ion permeation through the porous polymer membrane. The decrease in ion permeability leads to disadvantages such as an increase in voltage loss caused by the diaphragm. The diaphragm for alkaline water electrolysis of the present embodiment has been invented also in view of the above phenomenon and, the hydrophilic inorganic particles are securely held in the porous polymer membrane so as not to be detached from the porous polymer membrane even when various external forces as described above act on the diaphragm.

In the present embodiment, to keep a sufficient amount of the hydrophilic inorganic particles in the porous polymer membrane, the average pore sizes at both surfaces of the porous polymer membrane is controlled so as to prevent detachment of the hydrophilic inorganic particles. The pore size controlled so as to prevent detachment of the hydrophilic inorganic particles is a pore size such that the ratio of the mode particle size of the hydrophilic inorganic particles to the average pore size of the porous polymer membrane (mode particle size/average pore size) is 2.0 or more. When the mode particle size/average pore size ratio is 2.0 or more, detachment of the hydrophilic inorganic particles from the pores during electrolysis under a variable power supply is reduced so that the hydrophilicity of the porous polymer membrane can be maintained. To keep the ion permeability of the porous polymer membrane at a high level, the mode particle size/average pore size ratio is preferably less than 5.0. When the mode particle size/average pore size ratio is less than 5.0, not only can high ion permeability be achieved, but also clogging of the porous polymer membrane tends to be prevented even if impurities attach to the membrane during electrolysis. From this viewpoint, the mode particle size/average pore size ratio is more preferably less than 4.0.

It should be noted that a mode particle size/average pore size ratio of 2.0 or more is achieved for the average pore size at each of the two surfaces of the porous polymer membrane. The mode particle size/average pore size ratio can be controlled with the use of, for example, but not limited to, the below-described method for producing a diaphragm for alkaline water electrolysis.

One problem has been that bubbles of gases such as hydrogen gas and oxygen gas evolved from electrodes attach to and close the pores of a porous polymer membrane, thus deteriorating the ion permeability. Given that hydrogen gas and oxygen gas are not hydrophilic, bubbles of these gases would not readily attach to the surfaces of the porous polymer membrane as long as the surfaces of the porous polymer membrane have hydrophilicity. However, as a result of intensive studies on this problem, the present inventors have found that the bubble attachment occurs due to a gradual decrease in hydrophilicity of the porous polymer membrane caused by detachment of hydrophilic inorganic particles. In the case of the diaphragm for alkaline water electrolysis of the present embodiment, at least detachment of the hydrophilic inorganic particles from the pores of the porous polymer membrane can be reduced, so that high hydrophilicity can be maintained for a long period of time. This ultimately means that attachment of bubbles of gases such as hydrogen gas and oxygen gas to the surfaces of the pores can be prevented for a long period of time and thus that high ion permeability of the porous polymer membrane can be maintained for a long period of time.

In the present embodiment, the pore size of the porous polymer membrane is preferably controlled so as to be substantially symmetric with respect to the center line of the porous polymer membrane in its thickness direction from its center line toward its surfaces. When the porous polymer membrane has a symmetric pore size distribution, the membrane can, for example, exert the same function regardless of the way it is installed in an electrolytic cell, and tends to exert stable performance under variation in differential pressure. Furthermore, foreign matters are less likely to be lodged inside the porous membrane during electrolysis. It is more preferable for the pore size of the porous polymer membrane to gradually decrease in the thickness direction inwardly from the surfaces of the porous polymer membrane. The porous polymer membrane whose pore size gradually decreases in the thickness direction inwardly from its surfaces tends to maintain high separation capacity even if, for example, the surfaces of the membrane are damaged by foreign matters during use.

In terms of use in alkaline water electrolysis, the average water permeation pore size and the maximum pore size of the porous polymer membrane of the present embodiment are preferably controlled so that the gas purity can be kept within a safe concentration range even when a variable power supply is employed for the electrolysis. From this viewpoint, the average water permeation pore size of the porous polymer membrane is preferably 0.1 µm or more and 1.0 µm or less. The maximum pore size is preferably 0.2 µm or more and 2.0 µm or less. When the average water permeation pore size is within the above range, satisfactory ion permeability tends to be achieved, while the hydrophilic inorganic particles tend to be effectively prevented from being detached due to the permeation of the electrolyte solution through the diaphragm caused by the variable differential pressure. When the maximum pore size is within the above range, permeation of evolved gases tends to be effectively prevented while satisfactory ion permeability is maintained. From these viewpoints, the average water permeation pore size is more preferably 0.1 µm or more and 0.5 µm or less, and the maximum pore size is more preferably 0.5 µm or more and 1.8 µm or less. The average water permeation pore size and maximum pore size of the porous polymer membrane can be measured by the procedures described below.

The average water permeation pore size of the porous polymer membrane of the present embodiment can be measured, for example, by the following procedure using an integrity testing system ("Sartocheck Junior BP-Plus" available from Sartorius Stedim Japan K.K.). First, the porous polymer membrane is cut into a piece of given size including a core material, and the piece of the membrane is used as a sample. This sample is set in a given pressure-resistant vessel, and the vessel is filled with pure water. Next, the pressure-resistant vessel is placed in a thermostatic chamber set at a predetermined temperature, and the measurement is started at the time when the interior of the pressure-resistant vessel reaches the predetermined temperature. After the start of the measurement, the upper side of the sample is pressurized with nitrogen. The values of the pressure and permeation rate at which pure water permeates through the sample from its lower side are recorded. The average water permeation pore size can be determined by the following Hagen-Poiseuille equation using the gradient between the pressure and the water permeation rate during the period in which the pressure is between 10 kPa and 30 kPa.

Average water permeation pore size (m)=32 $\eta L\mu_0/(\epsilon P)$

In this equation, $\eta$ is the viscosity (Pa·S) of water, L is the thickness (m) of the porous polymer membrane, and $\mu_0$ is an apparent flow rate calculated by the following equation: $\mu_0$ (m/s)=flow rate (m$^3$/S)/flow passage area (m$^2$). $\epsilon$ is the porosity and P is the pressure (Pa).

The maximum pore size of the porous polymer membrane of the present embodiment can be measured, for example, by the following procedure using an integrity testing system ("Sartocheck Junior BP-Plus" available from Sartorius Stedim Japan K.K.). First, the porous polymer membrane is cut into a piece of given size including a core material, and the piece of the membrane is used as a sample. This sample is wet with pure water to allow pure water to enter the pores of the porous polymer membrane, and then the sample is set in a pressure-resistant vessel for measurement. Next, the pressure-resistant vessel is placed in a thermostatic chamber set at a predetermined temperature, and the measurement is started at the time when the interior of the pressure-resistant vessel reaches the predetermined temperature. After the start of the measurement, the upper side of the sample is pressurized with nitrogen. The nitrogen pressure at which gas bubbles begin to continuously emerge on the lower side of the sample is employed as a bubble point. The maximum pore size can be determined by the following bubble point equation which is a modification of the Young-Laplace equation.

Maximum pore size (m)=$4\gamma \cos \theta/P$

In this equation, $\gamma$ is the surface tension (N/m) of water, $\cos \theta$ is the contact angle (rad) between the porous polymer membrane surface and water, and P is the bubble point (Pa). The smaller the difference between the average pore size and maximum pore size is, the higher the separation performance of the porous polymer membrane tends to be. Since the variation in pore size in the thickness direction of the porous polymer membrane is made smaller, it is possible to reduce the likelihood that formation of pinholes will decrease the purity of gases evolved from the two electrode compartments.

(Porosity)

For the diaphragm for alkaline water electrolysis of the present embodiment, the porosity of the porous polymer membrane is controlled to maintain gas impermeability and hydrophilicity, prevent deterioration of ion permeability caused by bubble attachment, and keep stable electrolysis properties (such as low voltage loss) for a long period of time. It can be said that the porosity of the porous polymer membrane is associated with the proportion of the pores, which have an average pore size within the range described above and which have the ratio of the mode particle size of the hydrophilic inorganic particles to their average pore size within the above range, in the porous polymer membrane.

Increasing the porosity of the porous polymer membrane tends to lead to a better ion permeability, a lower likelihood of clogging, and a lower voltage loss in electrolysis. In addition, the weight per unit area of the membrane is reduced, so that the handling of the membrane tends to become easy.

Decreasing the porosity of the porous polymer membrane reduces the decrease in mechanical strength of the membrane and therefore the occurrence of mechanical defects such as rips and tears, thus allowing for an increase in safety and a reduction in thickness.

For the diaphragm for alkaline water electrolysis of the present embodiment, the porosity of the porous polymer membrane is 30% or more, preferably 35% or more, and more preferably 40% or more to achieve a good balance between high gas impermeability and low voltage loss. The porosity of the porous polymer membrane is 60% or less and preferably 55% or less. When the porosity of the porous polymer membrane is within the above range, both low voltage loss and high gas impermeability can be achieved, and high mechanical strength can be ensured to allow thickness reduction.

The porosity of the porous polymer membrane can be controlled with the use of, for example, but not limited to, the below-described method for producing a diaphragm for alkaline water electrolysis.

The porosity of the porous polymer membrane refers to the proportion of open pores which is determined by Archimedes method, and can be determined using a gravimeter and the following equation.

Porosity $P$ (%)=$\rho/(1+\rho)\times 100$

In this equation, $\rho$ is equal to (W3−W1)/(W3−W2), where W1 is a dry mass (g) of the porous polymer membrane, W2 is a mass in water (g) of the porous polymer membrane, and W3 is a water-saturated mass (g) of the porous polymer membrane. The weight in water refers to the weight as measured in water. The water-saturated weight refers to the weight as measured in air for the porous membrane retaining water in its pores.

In a method for measuring the porosity, the porous polymer membrane washed with pure water is cut into three pieces with a size of 3 cm×3 cm, and the three pieces are used as measurement samples. First, W2 and W3 of the sample are measured. After that, the porous polymer membrane is left to dry in a dryer set at 50° C. for 12 hours or more, and W1 of the membrane is then measured. The porosity is determined from the values of W1, W2, and W3. The values of the porosity are determined for the three samples, and the arithmetic average of the determined values is employed as the porosity P.

For the porous polymer membrane of the present embodiment, the opening area ratio of the surface of the porous polymer membrane is preferably controlled to allow the surface of the porous polymer membrane to maintain a higher level of hydrophilicity. To maintain high hydrophilicity, the opening area ratio is preferably 20% or more, more preferably 25% or more, and even more preferably 30% or more. To allow the porous polymer membrane of the present embodiment to securely hold the hydrophilic inorganic particles and maintain the strength of its surface, the opening area ratio is preferably 80% or less, more preferably 75% or less, and even more preferably 70% or less.

The opening area ratio of the porous polymer membrane of the present embodiment can be determined by the following procedure. First, an image of the surface of the porous polymer membrane is captured with a SEM. Next, the image is binarized using an image analysis software ("WinROOF" available from MITANI CORPORATION) to distinguish pores from the rest of the surface. Subsequently, the resulting binarized image is analyzed to determine the proportion of the pores to the entire image, and the determined proportion is employed as the opening area ratio. The opening area ratio is determined for three or more SEM images of different spots, and the average of the three or more values is employed.

(Thickness of Porous Polymer Membrane)

The thickness of the porous polymer membrane is preferably, but not limited to, 300 μm or more and 600 μm or less. When the thickness of the porous polymer membrane is 300 μm or more, better gas impermeability is achieved and, in addition, the strength of the porous membrane against impact tends to be further enhanced. From these viewpoints, the lower limit of the thickness of the porous polymer membrane is more preferably 350 μm or more and even more preferably 400 μm or more. When the thickness of the porous polymer membrane is 600 μm or less, permeation of ions is less likely to be obstructed by the resistance of the electrolyte solution contained in the pores during electrolysis operation, which tends to allow better ion permeability to be maintained. From this viewpoint, the upper limit of the thickness of the porous polymer membrane is more preferably 550 μm or less and even more preferably 500 μm or less. The above effects tend to be enhanced, especially when the polymer resin comprises at least one selected from the group consisting of polysulfone, polyethersulfone, and polyphenylsulfone.

In the present embodiment, the thickness of the porous polymer membrane can be measured by the method described in Examples below.

(Hydrophilic Inorganic Particles)

The porous polymer membrane of the present embodiment contains hydrophilic inorganic particles for the purpose of imparting hydrophilicity and controlling the surface morphology inside the pores of the porous membrane. In this case, the hydrophilic inorganic particles may attach to the surfaces of the porous polymer membrane or of the pores of the porous polymer membrane. Since the detachment of the hydrophilic inorganic particles from the porous polymer membrane may deteriorate the functions mentioned above, the hydrophilic inorganic particles can be attached to the porous polymer membrane by being partially embedded in the polymer resin. Further, the hydrophilic inorganic particles may be bound together with the polymer resin.

Examples of the hydrophilic inorganic particles include, but are not limited to, particles of at least one inorganic substance selected from the group consisting of: oxides or hydroxides of zirconium, bismuth, and cerium; oxides of Group IV elements of the periodic table; nitrides of Group IV elements of the periodic table; and carbides of Group IV elements of the periodic table. Among these, oxides of zirconium, bismuth, and cerium and oxides of Group IV elements of the periodic table are preferred in terms of chemical stability, more preferred are oxides of zirconium, bismuth, and cerium, and even more preferred is zirconium oxide. The surfaces of the hydrophilic inorganic particles have a polarity. Given the affinity of the hydrophilic inorganic particles to oxygen or hydrogen molecules which have low polarity and to water molecules which have high polarity in the electrolyte solution which is an aqueous solution, the water molecules, which have high polarity, are considered to be more readily adsorbed on the hydrophilic inorganic particles. Thus, when such hydrophilic inorganic particles are present on the surfaces of the membrane, water molecules are preferentially adsorbed on the surfaces of the membrane, and bubbles of oxygen molecules and hydrogen molecules are not adsorbed on the surfaces of the membrane. This is believed to allow effective prevention of attachment of gas bubbles to the surfaces of the porous polymer membrane. It should be noted that the production mechanism for the effect of the present embodiment is not limited to the above.

The mode particle size of the hydrophilic inorganic particles is that of the hydrophilic inorganic particles present in the form of secondary particles (aggregates) in the pores of the porous membrane, and corresponds to a particle size that gives the local maximum value in the particle size distribution.

An exemplary method for controlling the mode particle size of the hydrophilic inorganic particles is to adjust the sintering temperature in a sintering process.

The mode particle size can be measured by the following procedure. The polymer resin is dissolved away from the porous polymer membrane by means of a solvent capable of dissolving the polymer resin. The remaining hydrophilic inorganic particles are repeatedly washed three or more times using the above solvent in an amount which is 1000 or more times the weight of the hydrophilic inorganic particles. The washed hydrophilic inorganic particles are used as a measurement sample, for which the mode particle size is determined from a volume-based distribution obtained by laser diffraction-scattering method. The measurement of the mode particle size of the hydrophilic inorganic particles can be performed, for example, by a laser diffraction-scattering particle size distribution analyzer ("LA-950" available from HORIBA, Ltd.).

The hydrophilic inorganic particles are preferably in the form of fine particles in terms of ease of mixing with the polymer resin. The mode particle size of hydrophilic inorganic particles used as a material for producing the porous polymer membrane is preferably 0.3 μm or more and 5 μm or less. When, for example, hydrophilic inorganic particles having a mode particle size of 0.3 μm or more are used in production of a porous polymer membrane by a non-solvent-induced phase separation process, the polymer resin solution containing the hydrophilic inorganic particles is prevented from having an excessively high viscosity, and formation of unevenness in application of the polymer resin solution can therefore be effectively prevented. This tends to give a uniform porous polymer membrane. In addition, when the hydrophilic inorganic particles are incorporated into the pores of the porous polymer membrane in a non-solvent-induced phase separation process, secondary particles formed from aggregation in the pores have a size greater than the pore size of the porous polymer membrane, which tends to enhance the prevention of detachment of the hydrophilic inorganic particles from the porous polymer membrane. When the mode particle size of the hydrophilic inorganic particles is 5 μm or less, the area of contact of each hydrophilic inorganic particle with that portion of the porous polymer membrane which is other than the pores can be prevented from being excessively small relative to the size of the hydrophilic inorganic particle, and detachment of the hydrophilic inorganic particles from the porous polymer membrane tends to be further prevented. In addition, for example, damage to the porous membrane by the hydrophilic inorganic particles tends to be further prevented. It should be noted that the production mechanism for the effect of the present embodiment is not limited to the above.

For a diaphragm for alkaline water electrolysis according to another aspect of the present embodiment, bubble points before and after a cavitation test employing ultrasonic cleaning at a frequency of 40 kHz and a sound pressure of 190 db for 60 minutes as measured at 90° C. are 100 kPa or more.

The diaphragm for alkaline water electrolysis according to the other aspect of the present embodiment maintains its properties for a long period of time in electrolysis employing a variable power supply, and this is the reason why the hydrophilicity of the diaphragm is maintained before and after the cavitation test. The present inventors have found that a specific cavitation test produces, in an accelerated manner, stresses corresponding to those imposed on a diaphragm due to vibration or differential pressure in electrolysis employing a variable power supply. Specifically, cavitation induced by ultrasonic cleaning at a sound pressure of 190±5 db produces stresses corresponding to those imposed on a diaphragm due to variation in differential pressure or contact with gas bubbles when a variable power supply is used for voltage application, and accelerated conditions can be created by adjusting the frequency employed in the ultrasonic cleaning. A diaphragm that has bubble points before and after the cavitation test according to the present embodiment as specified above is therefore believed to be capable of stably maintaining its properties in long-term electrolysis under a variable power supply. The fact that the diaphragm maintains a bubble point after the cavitation test means that the hydrophilic inorganic fine particles remain held in the porous membrane. Such a diaphragm can be obtained by controlling the particle size of the hydrophilic inorganic particles and the pore size of the porous polymer membrane which have been described above. Enhancing the cohesion of secondary particles of the hydrophilic inorganic particles is also a preferred option to obtain the diaphragm for alkaline water electrolysis according to the other aspect of the present embodiment. For example, the secondary particles of the hydrophilic inorganic particles are bound to each other by a resin to form more cohesive aggregates. Cohesive aggregates can be controllably obtained with the use of, but not limited to, the below-described method for producing a diaphragm for alkaline water electrolysis.

In the diaphragm for alkaline water electrolysis according to the other aspect of the present embodiment, the abundance of the hydrophilic inorganic particles as calculated by particle analysis (this abundance may hereinafter be simply referred to as "inorganic particle abundance") is preferably 10% or more, more preferably 13% or more, and even more preferably 15% or more at both surfaces of the porous polymer membrane before and after the cavitation test. When the abundance of the hydrophilic inorganic particles is in the above range, the porous polymer membrane exhibits satisfactory hydrophilicity, which tends to provide improved gas impermeability and ion permeability. In addition, when the abundances are in the above range before and after the cavitation test, then this means that the hydrophilic inorganic particles form cohesive secondary particles. Thus, high hydrophilicity tends to be maintained in electrolysis under a variable power supply.

The "abundance of the hydrophilic inorganic particles" as described in the present embodiment is calculated by the particle analysis described later, and is used as a measure for evaluating the amount of the hydrophilic inorganic particles contained in a specific portion of the porous polymer membrane. In the particle analysis according to the present embodiment, both surfaces or a cross-section of the porous polymer membrane is surface-treated and then observed with a scanning electron microscope (SEM). The image captured by the SEM observation is analyzed to give a brightness distribution graph whose ordinate represents the number of pixels and whose abscissa represents the brightness. That is, the inorganic particle abundance is determined as a value (%) calculated by dividing the number of pixels with a brightness equal to or higher than a predetermined level by the total number of pixels. The details of the method of the particle analysis will be described in Examples.

The inorganic particle abundance in the diaphragm for alkaline water electrolysis according to the other aspect of the present embodiment is preferably controlled also in the thickness direction of the porous polymer membrane. Controlling the inorganic particle abundance in the thickness direction tends to allow the diaphragm to maintain its hydrophilicity satisfactorily even when the surfaces of the diaphragm are damaged during electrolysis. From this viewpoint, at a cross-section of the porous polymer membrane, the abundances of the hydrophilic inorganic particles before and after the cavitation test as calculated by particle analysis are preferably 10% or more, more preferably 13% or more, and even more preferably 15% or more. The "cross-section of the porous polymer membrane" as described herein refers to a cross-section obtained by cutting the porous polymer membrane in a direction perpendicular to the surfaces of the porous polymer membrane (i.e., the thickness direction) and more specifically refers to a region of such a cross-section up to 50 μm from each surface of the membrane. Detachment of the hydrophilic inorganic particles, which can occur when the porous polymer membrane is subjected to the cavitation test described above or placed in a variable power supply environment, tends to be observed in the vicinity of the surfaces of the porous polymer membrane. In view of this fact, the inorganic particle abundance at a cross-section of a region up to 50 μm from each surface of the porous polymer membrane is preferably controlled as described above.

The ratio of decrease, caused by the cavitation test, in the abundances of the hydrophilic inorganic particles at both surfaces or a cross-section of the porous polymer membrane is preferably less than 0.20, more preferably 0.15 or less, and even more preferably less than 0.1. When the ratio of decrease is in the above range, then this means that the hydrophilic inorganic particles form cohesive secondary particles. Thus, high hydrophilicity tends to be maintained in electrolysis employing a variable power supply. In addition, not only the decrease in hydrophilicity due to damage to the surfaces of the diaphragm, but also the decrease in breaking strength of the diaphragm can be effectively prevented, which tends to allow electrolysis to continue stably for a long period of time.

The ratio of decrease as described above can be determined by the following equation using the values of the abundances of the hydrophilic inorganic particles before and after the cavitation test.

$$\text{Ratio of decrease} = (\alpha - \beta)/\alpha$$

In this equation, $\alpha$ represents the abundance (%) of the hydrophilic inorganic particles before the cavitation test, and $\beta$ represents the abundance (%) of the hydrophilic inorganic particles after the cavitation test.

Examples of methods that can be employed to control the abundances of the hydrophilic inorganic particles at both surfaces or a cross-section of the porous polymer membrane within the range described above and control the ratio of decrease in the abundance within the range described above include, but are not limited to: adjusting the content of the hydrophilic inorganic particles in a solution to be applied to a substrate; adjusting the content of a solvent in a coagulation bath; and controlling the ratio between the mode particle size of the hydrophilic inorganic particles and the average pore sizes at both surfaces of the porous polymer membrane.

The pore size of the porous polymer membrane is preferably controlled in the same manner as described above. The average water permeation pore size, the maximum pore size, and the bubble points before and after the cavitation test, as described herein for the porous polymer membrane, refer to those measured at 90° C. according to the average water permeation pore size method and maximum pore size measurement method which have been described above.

It is preferable that the secondary particles of the hydrophilic inorganic particles which are present in the pores of the porous polymer membrane be securely bound together by the polymer resin. For example, when using a non-solvent-induced phase separation process in which the coagulation bath contains a solvent capable of dissolving the polymer resin, the hydrophilic inorganic particles do not reside in the polymer resin phase but move selectively to the poor solvent phase containing the solvent, since the hydrophilic inorganic particles, which are polarized, have higher affinity to the poor solvent phase than to the polymer resin phase. This results in aggregation of the particles in the pores of the porous polymer membrane. In this phase separation process, the poor solvent phase is a mixture containing the solvent, and the polymer resin dissolved in the solvent act as a binder between the hydrophilic inorganic particles, thus increasing the cohesion of the secondary particles which are aggregates. Increasing the cohesion of the secondary particles can prevent the secondary aggregates of the hydrophilic inorganic particles from being disintegrated and detached due to vibration of the porous polymer membrane or permeation of the electrolyte solution caused by a differential pressure.

In the non-solvent-induced phase separation process, the content of the solvent in the coagulation bath increases as solvent displacement proceeds along with phase separation. The increase in the content of the solvent in the coagulation bath retards the phase separation, thus limiting the membrane production rate and also making difficult the pore size control. It is therefore common practice to separate and collect the solvent or add a poor solvent so as to keep low the solvent content in the coagulation bath. As a result of intensive studies aimed at preventing detachment of hydrophilic inorganic particles from pores of a porous polymer membrane, the present inventors have found that, when membrane production is carried out by a non-solvent-induced phase separation process, the use of a coagulation bath containing an appropriate amount of solvent results in a diaphragm for alkaline water electrolysis having an appropriate porosity, which allows secondary particles of the hydrophilic inorganic particles to be so securely bound together by the polymer resin that both long-term gas impermeability and long-term ion permeability can be achieved.

In the present embodiment, the weight ratio of the hydrophilic inorganic particles to the polymer resin in the porous polymer membrane is preferably 1.0 or more and 10 or less, more preferably 2 or more and 7 or less, and even more preferably 2 or more and 5 or less. When the weight ratio of the hydrophilic inorganic particles to the polymer resin is equal to or more than the lower limit as mentioned above, it is possible, for example, to make higher the hydrophilicity of the interior of the porous polymer membrane during electrolysis and thus further prevent a gas evolved in one electrode compartment from passing through the porous polymer membrane to the other electrode compartment. In addition, the electrolyte solution can spread over the interior of the porous polymer membrane, so that the voltage loss caused by the porous polymer membrane can be kept lower. When the weight ratio of the hydrophilic inorganic particles to the polymer resin is equal to or less than the upper limit described above, the porosity of the porous polymer membrane is more easily controlled to be high.

(Porous Support)

It is preferable that the diaphragm for alkaline water electrolysis of the present embodiment further comprise a porous support. The diaphragm preferably has a structure in which a porous polymer membrane encloses a porous support, and more preferably has a structure in which porous polymer membranes are laminated on both surfaces of a porous support. The diaphragm may have a structure in which porous polymer membranes are laminated on both surfaces of a porous support in a symmetric manner.

Inclusion of a porous support further enhances the strength of the diaphragm. For example, defects such as cuts and tears in, and stretching of, the diaphragm due to mechanical stresses can be prevented. The diaphragm having a structure in which porous membranes are laminated on both surfaces of a porous support can, even when scratches or holes (such as pinholes) are made in one surface of the porous support, maintain gas impermeability by virtue of the porous membrane laminated on the other surface of the porous support. When the diaphragm has a structure in which porous membranes are laminated on both surfaces of a porous support in a symmetric manner, curling of the diaphragm can be effectively prevented, and ease of handling of the diaphragm during transportation or during installation is further improved.

The material of the porous support is preferably, but not limited to, a material that causes no substantial reduction in the permeability of the diaphragm to ions of an electrolyte solution. Examples of the material of the porous support include, but are not limited to, polyphenylene sulfide, polyethylene, polypropylene, fluorine resin, polyparaphenylene benzobisoxazole, polyketone, polyimide, and polyetherimide. Among these, polyphenylene sulfide is preferably contained. The use of polyphenylene sulfide allows the porous support to exhibit high resistance to high-temperature, high-concentration alkaline solutions and exhibit high chemical stability against active oxygen evolved from an anode during water electrolysis process. In addition, with the use of polyphenylene sulfide, the porous support can easily be processed into various forms such as a woven fabric and a non-woven fabric, and can thus be appropriately modified according to the intended application or intended use environment. The above-mentioned materials may be used alone or in combination of two or more thereof.

Examples of the porous support include, but are not limited to, a mesh, a porous membrane, a non-woven fabric, a woven fabric, and a composite fabric including a non-woven fabric and a woven fabric enclosed in the non-woven fabric. These may be use alone or in combination of two or more thereof. Examples of more preferred forms of the porous support include a mesh substrate made up of monofilaments of polyphenylene sulfide and a composite fabric including a non-woven fabric and a woven fabric enclosed in the non-woven fabric.

A porous support in the form of a mesh has a sufficiently large opening area ratio and thus tends to allow the diaphragm to maintain a higher level of ion permeability. In addition, such a porous support has high mechanical strength and thus tends to more effectively prevent breaking or dimensional change of the diaphragm. That is, a porous support in the form of a mesh is preferred in terms of mechanical strength and dimensional stability. Furthermore, separation of such a porous support from the porous polymer membrane can be effectively prevented by anchoring effect. When the porous support is made up of monofilaments, the filament diameter of the monofilaments is preferably, but not limited to, 50 μm or more and 300 μm or less. When the lower limit of the filament diameter of the monofilaments is set to be 50 µm or more, satisfactory mechanical strength is achieved, so that the porous polymer membrane tends to be more resistant to breaking. When the upper limit of the filament diameter is set to be 300 µm or less, unevenness of the mesh surface can be further reduced, so that the smoothness of the surface of the porous polymer membrane tends to be further improved.

A porous support in the form of a composite fabric including a non-woven fabric and a woven fabric enclosed in the non-woven fabric can be a flat, smooth substrate, and thus allows a porous polymer membrane to be evenly laminated thereon. Furthermore, such a porous support has a sufficiently large opening area ratio and thus tends to allow the diaphragm to maintain a higher level of ion permeability. In addition, such a porous support has high mechanical strength and thus tends to more effectively prevent breaking or dimensional change of the diaphragm. That is, a porous support in the form of a composite fabric including a non-woven fabric and a woven fabric enclosed in the non-woven fabric is preferred in terms of mechanical strength and dimensional stability. Furthermore, separation of such a porous support from the porous polymer membrane can be effectively prevented by anchoring effect. In production of the non-woven fabric, its fibers are oriented in a MD direction or TD direction. This may cause the non-woven fabric to be insufficient in tensile breaking strength, tensile breaking elongation, and tearing strength in one direction. In such a case, by enclosing a woven fabric in the non-woven fabric, the tensile breaking strength, tensile breaking elongation, and tearing strength can be enhanced in both MD and TD directions to achieve a satisfactory strength required of a core material. The material to be enclosed in the non-woven fabric need not be a woven fabric. For example, non-woven fabrics whose fibers are oriented in either the MD or TD direction may be stacked in such a manner that the directions of orientation are orthogonal to each other, and the stack may be enclosed in a non-woven fabric. The MD direction (machine direction) and the TD direction (transverse direction) as described herein respectively refer to the machine direction in membrane production and the direction orthogonal to the MD direction, unless otherwise specified.

An exemplary index indicating the ease of breaking of the diaphragm for alkaline water electrolysis of the present embodiment is the tensile breaking strength of the porous support. The tensile breaking strength of the porous support can be measured by a method according to JIS K 7161. With the use of a porous support having a higher tensile breaking strength, the diaphragm, when placed in an electrolytic cell and used for water electrolysis process, exhibits higher strength against pressure change in the electrolytic cell and is more effectively prevented from being broken. The tensile breaking strength is preferably, but not limited to, 30 N or more and 200 N or less, and more preferably 50 N or more and 150 N or more. When the tensile breaking strength is equal to or more than the above lower limit, satisfactory strength can be imparted to the diaphragm, so that breaking of the diaphragm tends to be more effectively prevented. In particular, when the tensile breaking strength is 50 N or more, the diaphragm can maintain more favorable strength for a long period of time during long-term electrolysis operation, so that the breaking of the diaphragm tends to be more effectively prevented.

When the tensile breaking strength is equal to or less than the upper limit, the diaphragm has appropriate flexibility and high conformability without being too rigid. Thus, when the diaphragm is installed in an electrolytic cell, no gap between the diaphragm and a gasket is formed, so that leakage of the electrolyte solution is not likely to occur. In particular, when the tensile breaking strength is 150 N or less, the diaphragm is easier to bend, and its ease of handling during transportation and installation tends to be further improved. The tensile breaking strength of the porous support as described herein refers to the tensile breaking strength in each of the MD and TD directions.

An exemplary index indicating the ease of handling of the diaphragm for alkaline water electrolysis of the present embodiment is the tensile breaking elongation of the porous support. The tensile breaking elongation of the porous support can be measured by a method according to JIS K 7161. The use of a porous support having a higher tensile breaking elongation allows the diaphragm to have better pliability and higher flexibility, which tends to further reduce the occurrence of defects such as break or crack in the diaphragm during installation in an electrolytic cell or transportation and also tends to further improve the ease of handling of the diaphragm. In terms of the ease of handling, the tensile breaking elongation of the porous support is preferably, but not limited to, 5% or more and 60% or less and more preferably 10% or more and 50% or less. When the tensile breaking elongation is 5% or more, breaking of the diaphragm during transportation or installation in an electrolytic cell tends to be more effectively prevented. When the tensile breaking elongation is 60% or less, this means that the porous support is not easily deformed and tends to maintain its shape as a core material. Furthermore, when the tensile breaking elongation is 10% or more, the porous support is likely to maintain satisfactory pliability after long-term electrolysis operation in a high temperature environment. When the tensile breaking elongation is 50% or less, the porous support is not easily deformed and can maintain high dimensional stability when exposed to a high temperature environment for a long period of time. The tensile breaking elongation of the porous support as described herein refers to the tensile breaking elongation in each of the MD and TD directions.

An exemplary index indicating the ease of breaking originating from a notch or pinhole formed in the diaphragm for alkaline water electrolysis of the present embodiment is the tearing strength of the porous support. The tearing strength of the porous support can be measured by a method according to JIS L 1096. With the use of a porous support having a higher tearing strength, defects such as breaking of the diaphragm due to its own weight can be more effectively prevented even when, for example, a notch or pinhole is formed in the diaphragm by contact with an electrode after the diaphragm is installed in an electrolytic cell. The tearing strength of the porous support is preferably, but not limited to, 10 N or more and 100 N or less. When the tearing strength is 10 N or more, a notch or pinhole formed in the diaphragm tends to be more effectively prevented from becoming wider. When the tearing strength is 100 N or less, the porous support is not likely to be a thick one or a solid one having few pores, so that a higher level of ion permeability tends to be maintained. The tearing strength of the porous support as described herein refers to the tearing strength in each of the MD and TD directions.

(Evaluation of Ion Permeability)

An exemplary index used to evaluate the cell voltage in electrolysis employing the diaphragm for alkaline water electrolysis of the present embodiment is the ion permeability of the diaphragm. A higher ion permeability of a diaphragm leads to a reduction in electrical resistance during electrolysis and hence a reduction in voltage loss caused by the diaphragm. The diaphragm of the present embodiment can maintain high ion permeability, and thus it can achieve a reduced cell voltage during electrolysis.

The cell voltage in electrolysis employing the diaphragm for alkaline water electrolysis of the present embodiment can be evaluated, for example, by the following procedure. The diaphragm is placed between nickel electrodes, and each of the two electrode compartments separated by the diaphragm is filled with a 30 wt % aqueous KOH solution having a temperature of 90° C. Electrolysis is performed by applying a direct current with a current density of 0.60 A/cm2 between the two electrodes for a long period of time. A potential difference between the two electrodes is measured 24 hours after the start of the electrolysis, and the potential difference between the two electrodes is employed as the cell voltage. Water in the aqueous KOH solution is consumed for electrolysis. Thus, during electrolysis, pure water is regularly added to keep constant the KOH concentration. In addition, the electrolyte solution in the electrode compartments is circulated by means of a pump so that oxygen and hydrogen evolved from the electrodes in the electrolytic cell do not become stagnant. The cell voltage in electrolysis operation performed using the diaphragm for alkaline water electrolysis of the present embodiment under the above conditions is not particularly limited. In a preferred example, the cell voltage can be 1.80 V or less, or even 1.75 V or less at a current density of 0.60 A/cm2. The cell voltage can be further reduced by adjusting the operation conditions. A reduction in voltage loss by a diaphragm for alkaline water electrolysis leads to high ion permeability, which allows water electrolysis process to be efficiently carried out with a small amount of electricity. In addition, in long-term operation at a high current density, it is possible to reduce the risk that the temperature of the electrolyte solution in the electrolytic cell is excessively increased by heat generated due to voltage loss or that degradation of the materials of the electrolytic cell and electrodes is accelerated.

(Evaluation of Gas Impermeability)

An exemplary index used to evaluate the gas impermeability of the diaphragm for alkaline water electrolysis of the present embodiment is the bubble point of the diaphragm for alkaline water electrolysis. The bubble point in the evaluation method is a pressure at which gas bubbles begin to continuously emerge on the other side of the diaphragm continuously at a rate of 150 mL/min, when one side of the diaphragm is pressurized with nitrogen after the diaphragm is fully wet with water to fill the pores with water. The lower the gas impermeability of the diaphragm is, the smaller the value of the bubble point is. The higher the gas impermeability of the diaphragm is, the less easily the gas passes through the diaphragm, and so the greater the value of the bubble point is.

The bubble point of the diaphragm for alkaline water electrolysis of the present embodiment is preferably 500 kPa or more at an ordinary temperature of 25° C. When the bubble point of the diaphragm is 500 kPa or more, hydrogen gas and oxygen gas attached to the surfaces of the diaphragm during electrolysis cannot easily pass through the diaphragm, so that mixing of oxygen and hydrogen tends to be more effectively prevented. For the diaphragm for alkaline water electrolysis according to another aspect of the present embodiment, the bubble points before and after the cavitation test as measured at 90° C. are 100 kPa or more. When the bubble point at 90° C. is equal to or more than the above limit, the performance of the diaphragm can be maintained for a long period of time in electrolysis employing a variable power supply, since the hydrophilic inorganic particles are not detached due to vibration or passage of the electrolyte solution during the electrolysis.

(Method for Producing Diaphragm for Alkaline Water Electrolysis)

The method for producing a diaphragm for alkaline water electrolysis according to the present embodiment preferably includes, but not limited to, the following steps of:

(A) preparing a solution containing a polymer resin, a solvent, and hydrophilic inorganic particles;

(B) applying the solution to a substrate to form a coating on the substrate;

(C) exposing a surface of the coating, said surface being located opposite from the substrate, to a gas containing vapor of a poor solvent for the polymer resin; and (D) immersing the coating on the substrate in a coagulation bath containing a poor solvent for the polymer resin to form a porous polymer membrane.

The above steps do not necessarily need to be performed in the order mentioned, as long as the effect of the present embodiment is obtained. The steps may be performed simultaneously or successively as appropriate.

The solvent used in the step (A) has the property of dissolving polymer resins, and is preferably a good solvent having a high ability to dissolve the polymer resin used. This solvent can be selected as appropriate depending on, for example, the type of the polymer resin used. Examples of the solvent include, but are not limited to, N-methyl-2-pyrrolidone, N,N-dimethylacetamide, N,N-dimethylformamide, and dimethyl sulfoxide. These solvents may be used alone or in combination of two or more thereof. Among these, N-methyl-2-pyrrolidone is more preferred in terms of, for example, the ability to dissolve various resins, non-volatility, and ease of solvent control.

The content of the polymer resin in the solution containing the polymer resin, hydrophilic inorganic particles, and solvent is preferably 5 mass % or more and 25 mass % or less and more preferably 10 mass % or more and 15 mass % or less. When the content of the polymer resin is equal to or less than the upper limit, the mechanical strength of the porous polymer membrane tends to be further improved. When the content of the polymer resin is equal to or more than the lower limit, viscosity increase of the solution can be reduced, and the ease of membrane production tends to be further improved, so that the thickness of the porous polymer membrane tends to be more uniform.

The content of the hydrophilic inorganic particles in the solution is preferably 10 mass % or more and 60 mass % or less and more preferably 25 mass % or more and 40 mass % or less. When the content of the hydrophilic inorganic particles is equal to or less than the upper limit, viscosity increase of the solution can be reduced, and the ease of membrane production tends to be further improved, so that the thickness of the porous polymer membrane tends to be more uniform. When the content of the hydrophilic inorganic particles is equal to or more than the lower limit, the hydrophilicity of the porous polymer membrane tends to be further improved.

The content of the solvent in the solution is preferably 30 mass % or more and 80 mass % or less and more preferably 45 mass % or more and 60 mass % or less. When the content of the solvent is equal to or less than the upper limit, viscosity increase of the solution can be reduced, and uneven application of the dispersion is further prevented. When the content of the solvent is equal to or more than the lower limit, a larger amount of the polymer resin can be dissolved and, in addition, the hydrophilic inorganic particles can be dispersed better in the solution.

The method used for preparing the solution is not particularly limited. For example, the following method can be used. The solvent for the polymer resin and the hydrophilic inorganic particles are placed in a pot of a ball mill, and then the contents in the pot of the ball mill are stirred to grind the hydrophilic inorganic particles and at the same time disperse the hydrophilic inorganic particles in the solvent for the polymer resin. The resulting liquid is then filtered to separate the balls from the liquid. After that, while the solution containing the hydrophilic inorganic particles dispersed therein is stirred with a mixing blade, the polymer resin is added and dissolved little by little in the solution. Thus, a solution for membrane production is prepared. If desired, an additive may be added for preparation of the solution. For the preparation of the solution, for example, the solvent for the polymer resin, the hydrophilic inorganic particles, and an additive may be placed in a pot of a ball mill together and then the contents in the pot of the ball mill may be stirred. Alternatively, an additive may be dissolved in the solvent for the polymer resin.

Examples of the method for applying to a substrate the solution containing the polymer resin, hydrophilic inorganic particles, and solvent in the step (B) include, but are not limited to: feeding the solution onto the substrate and then using a coater to scrape off an excess of the solution relative to the intended amount; immersing the substrate in the solution and then squeezing the substrate with a roll to remove an excess of the solution relative to the intended amount; immersing the substrate in the solution and then using a coater to scrape off an excess of the solution relative to the intended amount; and feeding the coating liquid to the substrate through a T-die. Examples of the method for adjusting the thickness of the porous polymer membrane include, but are not limited to: adjusting the distance between the substrate and a coater used for application of the solution; and adjusting the amount of the solution to be applied through a T-die.

The poor solvent used in each of the step (C) and step (D) is a solvent in which the polymer resin is substantially insoluble, and are preferably a non-solvent in which the polymer resin is completely insoluble. The poor solvent can be selected as appropriate depending on the type of the polymer resin used. Examples of the poor solvent include, but are not limited to, water, methanol, ethanol, propyl alcohol, isopropyl alcohol, butyl alcohol, and isobutyl alcohol.

To control the pore size of the surfaces of the porous polymer membrane, it is preferable, for example, to perform the step (C) of exposing a surface of the coating, said surface being located opposite from the substrate, to a gas containing vapor of a poor solvent for the polymer resin between the step (B) of applying the solution to the substrate to form the coating on the substrate and the step (D) of immersing the coating on the substrate in a coagulation bath containing a poor solvent for the polymer resin to form a porous polymer membrane.

When the coating applied to the substrate is exposed to a gas containing vapor of a poor solvent, a slight amount of the poor solvent penetrates into the coating from its surface exposed to the vapor. In the region of the coating that is infiltrated with the poor solvent, non-solvent-induced phase separation begins and proceeds sufficiently before the coating is immersed in a coagulation bath. If the coating is immersed in a coagulation bath containing a poor solvent for the polymer resin without exposure of the coating to any poor solvent, the coating surface having undergone little phase separation coagulates, so that the surface pore size tends to be small. The surface pore size being excessively small tends to lead to poor ion permeability of the resulting diaphragm, resulting in an increase in voltage loss. In addition, since the displacement of the solvent of the polymer resin by the poor solvent in the interior of the coating takes place through the minute pores formed in the coating surface, a long time is required for completion of coagulation of the interior of the coating. This tends to increase the time taken for phase separation in the interior of the coating and thus lead to formation of large voids in the membrane. The formation of large voids in the membrane may cause a decrease in gas impermeability or strength of the membrane. Thus, it is preferable to include the step of exposing the coating surface to a gas containing vapor of a poor solvent and thereby infiltrating the coating surface with the poor solvent, since in this case, for example, the average pore sizes at the surfaces of the porous polymer membrane can easily be controlled so as to be equal to or greater than the lower limit described above. The pore size of the surfaces of the porous polymer membrane can be controlled, for example, by adjusting the amount of the vapor with which the coating is infiltrated.

As for the method for vapor generation, for example, vapor may be generated by increasing the temperature of the coagulation bath in which the applied solution is immersed, or a vapor generation bath separate from the coagulation bath may be used for vapor generation. The temperature of vapor generation is preferably, but not limited to, 30° C. or higher and 100° C. or lower. When the temperature of vapor generation is 30° C. or higher, vapor can be readily generated in such an amount as to infiltrate the applied solution and allow phase separation to proceed.

The time of exposure of the coating surface to a gas containing vapor of a poor solvent is preferably, but not limited to, 3 seconds or more and 60 seconds or less. A suitable time of exposure of the coating surface to a gas containing vapor of a poor solvent can be selected as appropriate depending on, for example, the composition of the coating and the temperature of the vapor generation bath. In general, it is preferable that the exposure time be 3 seconds or more, since in this case, for example, the pore size of the surfaces of the porous polymer membrane can be prevented from being excessively small, and the average pore sizes at the surfaces of the porous polymer membrane can easily be controlled so as to be equal to or greater than the lower limit described above. This allows the diaphragm to have good ion permeability, which makes it possible to more effectively prevent the increase in voltage loss during operation. In addition, the formation of large voids inside the porous polymer membrane is reduced, so that high gas impermeability can be maintained. It is preferable that the exposure time be 60 seconds or less, since in this case, for example, the coating is not readily coagulated by the gas containing the poor solvent vapor even if the temperature of the vapor generation bath is high, the pore size of the surfaces of the porous polymer membrane can be prevented from being excessively large, and thus the average pore sizes at the surfaces of the porous polymer membrane can easily be controlled so as to be equal to or less than the upper limit described above. This allows more effective prevention of the detachment of the hydrophilic inorganic particles from, for example, the pores of the porous polymer membrane.

Examples of the method for controlling the pore size of the porous polymer membrane include, but are not limited to, adding an additive for pore size control to the solution containing the hydrophilic inorganic particles, the polymer resin, and the solvent for the polymer resin. With this method, the pore size of the porous membrane can be controlled by varying the rate of non-solvent-induced phase separation induced by contact of the solution with the coagulation bath containing a poor solvent for the polymer resin, or by eluting the additive from the coagulated polymer resin. Examples of the additive for pore size control include, but are not limited to, the organic compounds and inorganic compounds mentioned below.

As the organic compound, it is preferable to use those soluble in both the above solvent and the above poor solvent for the polymer resin. A suitable organic compound can be selected as appropriate depending on, for example, the types of the solvent and poor solvent to be used, and examples of the organic compound include polyethylene glycol, polyethylene oxide, polyvinylpyrrolidone, polyethyleneimine, polyacrylic acid, and dextran. Among these, polyethylene glycol, polyethylene oxide, and polyvinylpyrrolidone are more preferred, in particular, in terms of compatibility with the solvent. Even more preferred are polyethylene glycol having a molecular weight of from 10000 to 50000, polyethylene oxide having a molecular weight of from 50000 to 300000, and polyvinylpyrrolidone having a molecular weight of from 30000 to 1000000, since these compounds can significantly vary the phase separation rate even when added in a small amount. These may be used alone or in combination of two or more thereof.

The inorganic compound used is preferably soluble in both the above solvent and the above poor solvent for the polymer resin. A suitable inorganic compound can be selected as appropriate depending on, for example, the types of the solvent and poor solvent to be used, and preferred examples of the inorganic compound include calcium chloride, magnesium chloride, lithium chloride, and barium sulfate. These may be used alone or in combination of two or more thereof.

The amount of the additive used is preferably, but not limited to, 0.1 wt % or more and 10 wt % or less relative to the solution containing the hydrophilic inorganic particles, the polymer resin, and the solvent for the polymer resin. When the amount of the additive used is in the above range, the phase separation rate and pore size are likely to be controlled properly, and the additive remaining inside the porous polymer membrane tends to be easily decreased by washing or the like. From this viewpoint, the amount of the additive used is more preferably 0.5 wt % or more and 5 wt % or less.

Alternatively, the phase separation rate, and therefore the pore size at the surfaces of the porous polymer membrane, may be controlled by adjusting the type, concentration, and temperature of the poor solvent in the coagulation bath without using the additive. In general, the higher the phase separation rate is, the smaller the average pore size tends to be, while the lower the phase separation rate is, the greater the average pore size tends to be. It is also effective to add a poor solvent for the polymer resin to the solution containing the polymer resin and the solvent for the polymer resin to vary the phase separation rate and thereby control the average pore size of the porous polymer membrane. From this viewpoint, the concentration of the poor solvent in the coagulation bath is preferably 30 vol % or more and 70 vol % or less, and more preferably 40 vol % or more and 60 vol % or less. The temperature of the coagulation bath is preferably 20° C. or higher and 60° C. or lower and more preferably 30° C. or higher and 50° C. or lower.

The coagulation bath used in the step (D) preferably contains the solvent capable of dissolving the polymer resin described above, in addition to the poor solvent. The addition of the solvent allows control of the phase separation rate and therefore control of the pore size of the porous membrane. The addition of the solvent to the coagulation bath can reduce the rate of displacement between the solvent in the coating and the poor solvent in the coagulation bath and thus lengthen the time spent on phase separation to complete coagulation, thereby tending to increase the pore size. When the coagulation bath contains the solvent, the amount of the polymer resin eluted into the poor solvent phase during the phase separation process is increased, so that aggregation of the hydrophilic inorganic particles which also move into the poor solvent phase tends to be enhanced due to binding with the eluted polymer resin. As the solvent, those mentioned above can be used.

As for the poor solvent used in the step (D), the proportion of the poor solvent contained in the coagulation bath is preferably 30 vol % or more, in order for the non-solvent-induced phase separation to proceed sufficiently and for the polymer resin to coagulate sufficiently. In addition, it is preferable for a solvent to be contained in the coagulation bath in an amount so that the proportion of the poor solvent is 70 vol % or less. When the proportion of the poor solvent is in the above range, namely, when the proportion of the solvent is 30 vol % or more, cohesion of the secondary particles of the hydrophilic inorganic particles is enhanced due to binding with the polymer resin, so that the performance of the diaphragm tends to be maintained for a longer period of time under variable differential pressure. From this viewpoint, the proportion of the poor solvent contained in the coagulation bath is more preferably 40 vol % or more and 60 vol % or less. As the solvent contained in the coagulation bath, one solvent or a combination of two or more solvents can be used. A solvent identical to the solvent used in the step (A) may be used, or another solvent may be used. The solvent contained in the coagulation bath is more preferably N-methyl-2-pyrrolidone, in terms of the ability to dissolve various resins, non-volatility, and ease of handling of solvent control.

It is preferable that the porous polymer membrane obtained in the production example described above have portions lying inside the pores of the porous support and thus be united with the porous support. When the porous polymer membrane and the porous support are united together, separation of the porous support from the porous polymer membrane tends to be more effectively prevented by so-called anchoring effect.

The porous polymer membrane produced may be subjected to heat treatment. The heat treatment can crystalize or immobilize the polymer chains of the polymer resin and thus further stabilize the structure of the porous polymer membrane. Examples of the method for the heat treatment include, but are not limited to: immersing the porous polymer membrane in a hot water bath; sandwiching the porous polymer membrane between hot metal plates to press the porous polymer membrane; and sandwiching the porous polymer membrane between hot rolls to press the porous polymer membrane. The heat treatment temperature is preferably, but not limited to, 80° C. or higher and 210° C. or lower, and more preferably 180° C. or higher and 210° C. or lower. When the heat treatment temperature is 80° C. or higher, the heat treatment temperature is higher than the temperature at which the porous polymer membrane is used for water electrolysis. Thus, when the porous polymer membrane is used as a diaphragm, an undesired phenomenon, such as that where the structure of the porous polymer membrane becomes unstable due to re-mobilization of the polymer chains of the polymer resin, tends to be effectively prevented. When the heat treatment temperature is 210° C. or lower, thermal degradation of the polymer tends to be effectively prevented. When the heat treatment temperature is 180° C. or higher, the heat treatment temperature is equal to or higher than the glass-transition point of commonly-used polymer resins. Thus, the polymer chains can be crystallized or immobilized to allow the porous polymer membrane to have higher heat resistance.

The method for producing a diaphragm for alkaline water electrolysis according to the present embodiment preferably includes the following steps of:

(E) mixing the polymer resin, a solvent capable of dissolving the polymer resin, and the hydrophilic inorganic particles to obtain a homogeneous dispersion, at a temperature higher than a phase separation temperature of the dispersion to be obtained;

(F) extruding the dispersion at a temperature higher than the phase separation temperature of the dispersion to obtain an extrudate;

(G) cooling the extrudate obtained in the step (F) to a temperature equal to or lower than the phase separation temperature of the dispersion to coagulate the extrudate; and (H) extracting the solvent from the extrudate obtained in the step (G) to obtain a porous polymer membrane.

The weight ratio between the polymer resin and the solvent for the polymer resin (polymer resin:solvent) in the step (E) is preferably in the range of from 5:95 to 50:50.

The step (G) more preferably further includes the step of, immediately after the step (F), cooling the extrudate by immersing the extrudate in a solution containing a non-solvent for the polymer resin and having a temperature equal to or higher than 0° C. and equal to or lower than the phase separation temperature of the dispersion.

A preferred example of the method for controlling the pore size of the porous polymer membrane is the use of a plasticizer as the solvent for the polymer resin. The plasticizer does not exhibit dissolving ability at ordinary temperatures but exhibits at high temperatures, and increasing the mixing ratio of the plasticizer can lower the phase separation temperature of the dispersion. The pore size of the porous polymer membrane can be controlled depending on the difference between the phase separation temperature and the cooling temperature and on the type of the phase separation process. Thus, the pore size of the porous polymer membrane can be controlled by controlling the mixing ratio between the polymer resin and the plasticizer for the polymer resin. Typical examples of the phase separation process (thermally-induced phase separation) include solid-liquid phase separation and liquid-liquid phase separation. The former is phase separation between the polymer resin (solid) and the plasticizer (liquid) and, in this phase separation, the domain of the polymer resin is relatively large, so that a porous body having a wide pore size distribution tends to be formed. The latter is a phase separation process where the polymer resin-rich or plasticizer-rich phase forms a bicontinuous structure while keeping its liquid state and, in this phase separation process, the domain of the polymer resin is relatively small, so that a porous body having a small pore size distribution and a narrow pore size distribution tends to be formed. In the case of the above thermally-induced phase separation, the secondary particles of the hydrophilic inorganic particles can be securely bound by producing the porous polymer membrane through liquid-liquid phase separation using a dispersion containing an appropriate amount of plasticizer under appropriate temperature conditions or by optionally introducing a stretching step. This tends to allow both long-term gas impermeability and long-term ion permeability to be achieved.

Examples of the plasticizer for the polymer resin include, but are not limited to: acetone; tetrahydrofuran; N-methyl-2-pyrrolidone; dimethyl sulfoxide; chloroform; N,N-dimethylformamide; phthalic acid esters such as dibutyl phthalate, dioctyl phthalate, and di(2-ethylhexyl) phthalate; sebacic acid esters such as dibutyl sebacate and dioctyl sebacate; adipic acid esters such as dibutyl adipate and dioctyl adipate; trimellitic acid esters such as tributyl trimellitate and trioctyl trimellitate; benzoic acid esters such as methyl benzoate and ethyl benzoate; phosphoric acid esters such as tributyl phosphate, tricresyl phosphate, and trioctyl phosphate; ketones such as γ-butyrolactone, ethylene carbonate, propylene carbonate, cyclohexanone, acetophenone, and isophorone; glycerin esters such as propylene glycol dicaprate and propylene glycol dioleate; paraffins such as liquid paraffin; formic acid esters such as octyl formate and 2-ethylhexyl formate; acetic acid esters such as octyl acetate and heptyl acetate; propionic acid esters such as heptyl propionate and hexyl propionate; butyric acid esters such as hexyl butyrate and butyl butyrate; isobutyric acid esters such as methyl isobutyrate and ethyl isobutyrate; valeric acid esters such as butyl valerate and propyl valerate; isovaleric acid esters such as ethyl isovalerate and methyl isovalerate; hexanoic acid esters such as butyl hexanoate and propyl hexanoate; heptanoic acid esters such as methyl heptanoate and ethyl heptanoate; octanoic acid esters such as methyl octanoate and ethyl octanoate; cyclohexanecarboxylic acid esters such as methyl cyclohexanecarboxylate and ethyl cyclohexanecarboxylate; trifluoroacetic acid esters such as octyl trifluoroacetate and heptyl trifluoroacetate; difluoroacetic acid esters such as ethyl difluoroacetate, methyl difluoroacetate, and ethyl difluoroacetate; perfluoropropionic acid esters such as methyl perfluoropropionate and ethyl perfluoropropionate; perfluorobutanoic acid esters such as methyl perfluorobutanoate and ethyl perfluorobutanoate; perfluoropentanoic acid esters such as methyl perfluoropentanoate and ethyl perfluoropentanoate; nitriles such as decanenitrile and nonanenitril; benzonitirles such as pentafluorobenzonitrile and 2,6-difluorobenzonitrile; pentafluorobenzoates such as ethyl pentafluorobenzoate and methyl pentafluorobenzoate; alcohols such as 7,7,8,8,8-pentafluoro-1-octanol and 7,8,8,8-tetrafluoro-7-(trifluoromethyl)-1-octanol; and mixtures of the above compounds.

The weight ratio between the polymer resin and the plasticizer (polymer resin:plasticizer) in the mixture thereof is preferably, but not limited to, from 10:90 to 50:50. When the weight ratio of the polymer resin is 10 mass % or more, the porous polymer membrane tends to have sufficient strength. When the weight ratio of the polymer resin is 50 mass % or less, the polymer resin and the plasticizer form together a bicontinuous structure in phase separation process, so that the pore size tends to be controlled so as to become more uniform. In order for the pore size to be controlled so as to be optimal for alkaline water electrolysis, the mixing weight ratio between the polymer resin and the plasticizer (polymer resin:plasticizer) is more preferably from 20:80 to 40:60. A solvent for the polymer resin may be added, in addition to the polymer resin and plasticizer as described above.

Another example of the method for controlling the pore size of the porous polymer membrane is to add an additive for pore size control to the dispersion of the polymer resin and the solvent for the polymer resin. With this method, the pore size of the porous polymer membrane can be controlled by varying the rate of thermally-induced phase separation which proceeds during cooling of an extrudate obtained after extrusion of the dispersion, or by eluting the additive from the coagulated polymer resin. Examples of the additive for pore size control include, but are not limited to, the organic compounds and inorganic compounds mentioned below.

The organic compound that may be used for addition to the dispersion is preferably soluble in the above solvent for the polymer resin. A suitable organic compound can be selected as appropriate depending on, for example, the type of the solvent to be used, and examples of the organic compound include polyethylene glycol, polyethylene oxide, polyvinylpyrrolidone, polyethyleneimine, polyacrylic acid, and dextran. Among these, polyethylene glycol, polyethylene oxide, and polyvinylpyrrolidone are more preferred, in particular, in terms of compatibility with the solvent for the polymer resin. Even more preferred are polyethylene glycol having a weight-average molecular weight of from 10000 to 50000, polyethylene oxide having a weight-average molecular weight of from 50000 to 300000, and polyvinylpyrrolidone having a weight-average molecular weight of from 30000 to 1000000, since these compounds can significantly vary the phase separation rate of the dispersion even when added in a small amount. These may be used alone or in combination of two or more thereof.

The inorganic compound that may be used for addition to the dispersion may be soluble in the above solvent for the polymer resin, and is preferably soluble in an alkaline solution. A suitable inorganic compound can be selected as appropriate depending on, for example, the type of the solvent to be used, and preferred examples of the inorganic compound include calcium chloride, magnesium chloride, lithium chloride, barium sulfate, and silica. These may be used alone or in combination of two or more thereof.

The amount of the additive used is preferably, but not limited to, 0.1 wt % or more and 10 wt % or less relative to the dispersion containing the polymer resin and the solvent for the polymer resin. When the amount of the additive used is in the above range, the phase separation rate and pore size are likely to be controlled properly, and the additive remaining inside the porous polymer membrane tends to be easily removed by washing or the like. From this viewpoint, the amount of the additive used is more preferably 0.5 wt % or more and 5 wt % or less.

Alternatively, the phase separation rate of the dispersion, and therefore the pore size at the surfaces of the porous polymer membrane, may be controlled by adjustment of concentration and temperature without using the additive. In general, the higher the phase separation rate is, the smaller the average pore size tends to be, while the lower the phase separation rate is, the greater the average pore size tends to be. It is also effective to add a poor solvent for the polymer resin to the dispersion containing the polymer resin and the solvent for the polymer resin to vary the phase separation rate of the dispersion and thereby control the average pore size of the porous polymer membrane.

The poor solvent for the polymer resin that may be added to the dispersion is a solvent that does not substantially dissolve the polymer resin, and is preferably a non-solvent that never dissolves the polymer resin. The poor solvent for the polymer resin can be selected as appropriate depending on the type of the polymer resin to be used. Examples of the poor solvent for the polymer resin include, but are not limited to, water, methanol, ethanol, propyl alcohol, isopropyl alcohol, butyl alcohol, and isobutyl alcohol.

The content of the polymer resin in the dispersion containing the polymer resin, the hydrophilic inorganic particles, and the solvent for the polymer resin is preferably 5 mass % or more and 50 mass % or less and more preferably 15 mass % or more and 40 mass % or less. When the content of the polymer resin is equal to or less than the upper limit, the mechanical strength of the porous polymer membrane tends to be further improved. When the content of the polymer resin is equal to or more than the lower limit, viscosity increase of the dispersion can be reduced, and the ease of membrane production tends to be further improved, so that the thickness of the porous polymer membrane tends to be more uniform.

The content of the hydrophilic inorganic particles in the dispersion is preferably more than 5 mass % and 40 mass % or less and more preferably 10 mass % or more and 30 mass % or less. When the content of the hydrophilic inorganic particles is equal to or less than the upper limit, viscosity increase of the dispersion can be reduced, and the ease of membrane production tends to be further improved, so that the thickness of the porous polymer membrane tends to be more uniform. When the content of the hydrophilic inorganic particles is more than the lower limit, the hydrophilicity of the porous polymer membrane tends to be further improved.

The content of the solvent for the polymer resin in the dispersion is preferably 35 mass % or more and 90 mass % or less and more preferably 45 mass % or more and 80 mass % or less. When the content of the solvent for the polymer resin is equal to or less than the upper limit, viscosity increase of the dispersion can be reduced, and uneven application of the solution is further prevented. When the content of the solvent for the polymer resin is equal to or more than the lower limit, a larger amount of the polymer resin can be dissolved and, in addition, the hydrophilic inorganic particles can be dispersed better in the dispersion.

The method for preparing the dispersion is not particularly limited. For example, the following method can be used. The polymer resin and the hydrophilic inorganic particles are placed in a plast mill, and kneaded to uniformly disperse the hydrophilic inorganic particles in the polymer resin. After that, the resulting mixture and the solvent for the polymer resin are placed in an extruder, and are kneaded and extruded. Subsequently, the solvent is extracted with methylene chloride. Thus, a porous polymer membrane can be obtained. If desired, an additive may be added and kneaded. For the preparation of the mixture, for example, the polymer resin, the solvent for the polymer resin, the hydrophilic inorganic particles, and the additive may be placed together in a plast mill and then kneaded.

In the diaphragm for alkaline water electrolysis of the present embodiment, the above porous polymer membrane containing the polymer resin is preferably laminated on a porous support. Examples of the method for lamination include, but are not limited to: feeding the porous polymer membrane onto the porous support and then pressure-bonding them by hot pressing; and extruding the dispersion through a T-die onto the porous support to unite the porous polymer membrane and the porous support together. Examples of the method for adjusting the thickness of the porous polymer membrane include, but are not limited to: adjusting the temperature of the dispersion; and adjusting the amount of the dispersion to be applied through a T-die.

It is preferable that the porous polymer membrane have portions lying inside the pores of the porous support and thus be united with the porous support. When the porous polymer membrane and the porous support are united together, separation of the porous support from the porous polymer membrane tends to be more effectively prevented by so-called anchoring effect.

The porous polymer membrane produced may be subjected to heat treatment. The heat treatment can crystalize or immobilize the polymer chains of the polymer resin and thus further stabilize the structure of the porous polymer membrane. Examples of the method for the heat treatment include, but are not limited to: immersing the porous polymer membrane in a hot water bath; sandwiching the porous polymer membrane between hot metal plates to press the porous polymer membrane; and sandwiching the porous polymer membrane between hot rolls to press the porous polymer membrane. The heat treatment temperature is preferably, but not limited to, 120° C. or higher and 160° C. or lower, and more preferably 120° C. or higher and 140° C. or lower. When the heat treatment temperature is 120° C. or higher, the heat treatment temperature is higher than the temperature at which the porous polymer membrane is used for water electrolysis. Thus, when the porous polymer membrane is used as a diaphragm, an undesired phenomenon, such as that where the structure of the porous polymer membrane becomes unstable due to re-mobilization of the polymer chains of the polymer resin, tends to be effectively prevented. When the heat treatment temperature is 170° C. or lower, thermal degradation of the polymer tends to be effectively prevented. When the heat treatment temperature is 120° C. or higher, the heat treatment temperature is equal to or higher than the glass-transition point of commonly-used polymer resins. Thus, the polymer chains can be crystallized or immobilized to allow the porous polymer membrane to have higher heat resistance.

The porous polymer membrane may be subjected to a stretching step. The step of stretching the porous polymer membrane to obtain a diaphragm for alkaline water electrolysis can use, for example, but not limited to, a biaxial stretching machine. The stretching temperature can be selected as appropriate, as long as it is equal to or higher than the glass transition temperature of the polymer resin and equal to lower than the melting point of the polymer resin. In the stretching step, stretching may be performed in two axial directions simultaneously, or stretching in the MD direction and stretching in the TD direction may be performed independently from each other. The stretching ratio in the MD direction and the stretching ratio in the TD direction can be set independently from each other, depending on the thickness of the porous polymer membrane before stretching and the thickness of the diaphragm to be finally obtained. The area stretching ratio is preferably 10 or more times and 100 or less times. The term "area stretching ratio" as used herein refers to the ratio of the area of the porous polymer membrane after stretching to the area of the diaphragm for alkaline water electrolysis before stretching. Thus, the stretching ratio is preferably 4 or more times and 10 or less times in each of the MD and TD directions. Furthermore, the stretched diaphragm for alkaline water electrolysis may be calcined at a temperature equal to or higher than the melting point of the polymer resin.

The method for producing the diaphragm for alkaline water electrolysis according to the present embodiment preferably includes the following steps of:

(I) paste-extruding a mixture containing a polymer resin and hydrophilic inorganic particles;

(J) rolling the extruded paste to obtain a sheet-shaped porous membrane; and (K) stretching the obtained sheet-shaped porous membrane in a longitudinal direction (MD) and/or a transverse direction (TD).

Examples of the method for obtaining the mixture include, but are not limited to, crushing and mixing using a ball mill. The crushing and mixing may be a dry process or a wet process using a dispersion medium such as water, ethanol, or a commercially-available liquid lubricant. In the case of a dry process, the content of the polymer resin in the mixture is preferably 20 mass % or more and less than 50 mass %, and the content of the hydrophilic inorganic particles in the mixture is preferably 50 mass % or more and less than 80 mass %. When the composition of the mixture meets the above range, the diaphragm for alkaline water electrolysis tends to have sufficient hydrophilicity. When the crushing and mixing is performed as a wet process, the crushing and mixing is preferably performed in a dispersion medium in an amount of 20 parts by mass or more and 300 parts by mass or less relative to 100 parts by mass of the mixture with the above composition. When the amount of the dispersion medium is in this above range, the dispersion state in the mixture tends to be so good that a uniform diaphragm is obtained. When the uniformity of the dispersion medium is high, the secondary particles of the hydrophilic inorganic particles after rolling can remain firmly bound by the polymer resin lying in the gaps between the hydrophilic inorganic particles, so that both gas impermeability and ion permeability tend to be maintained for a long period of time.

The dispersion medium may be removed by heating or the like after the crushing and mixing.

Another example of the method for obtaining the mixture is to prepare a master batch containing the polymer resin and the hydrophilic inorganic particles. The preparation of the master batch tends to allow the hydrophilic inorganic particles having uniform particle sizes to be uniformly dispersed in the polymer resin.

Examples of the method for obtaining the sheet-shaped porous membrane include, but are not limited to, include paste-extruding the mixture into a rod shape at a temperature equal to or lower than the glass transition temperature of the polymer resin and then rolling the extrudate at a temperature equal to or lower than the melting point of the polymer resin. In this case, when a dispersion medium is contained, the dispersion medium is expected to provide an effect as an extrusion aid. It is preferable to remove the dispersion medium by heat drying after rolling. The thickness after the rolling can be selected as appropriate by taking into account the stretching step. The thickness after the rolling is preferably 300 μm or more and 10 mm or less. When the thickness after the rolling is in the above range, the mechanical strength required of the diaphragm for alkaline water electrolysis can be satisfactorily maintained after the rolling, so that the likelihood of breakage during the stretching step tends to be reduced. From this viewpoint, the thickness after the rolling is more preferably 500 μm or more and 1.5 μm or less.

The step of stretching the sheet-shaped porous membrane to obtain a diaphragm for alkaline water electrolysis can use, for example, but not limited to, a biaxial stretching machine. The stretching temperature can be selected as appropriate, as long as it is equal to or higher than the glass transition temperature of the polymer resin and equal to lower than the melting point of the polymer resin. In the stretching step, stretching may be performed in two axial directions simultaneously, or stretching in the MD direction and stretching in the TD direction may be performed independently from each other. The stretching ratio in the MD direction and the stretching ratio in the TD direction can be set independently from each other, depending on the thickness of the sheet-shaped porous membrane before stretching and the thickness of the diaphragm to be finally obtained. The area stretching ratio is preferably 10 or more times and 100 or less times. The term "area stretching ratio" as used herein refers to the ratio of the area of the sheet-shaped porous membrane after stretching to the area of the diaphragm for alkaline water electrolysis before stretching. Thus, the stretching ratio is preferably 4 or more times and 10 or less times in each of the MD and TD directions. Furthermore, the stretched diaphragm for alkaline water electrolysis may be calcined at a temperature equal to or higher than the melting point of the polymer resin. Examples of the method for controlling the pore size in production of the diaphragm for alkaline water electrolysis include, but are not limited to: controlling the stretching ratio; and controlling the composition of the mixture containing the polymer resin and the hydrophilic inorganic particles.

In the diaphragm for alkaline water electrolysis of the present embodiment, the above porous polymer membrane containing the polymer resin is preferably laminated on a porous support. Examples of the method for lamination include, but are not limited to: feeding the porous polymer membrane onto the porous support and then pressure-bonding them by hot pressing; and extruding a dispersion through a T-die onto the porous support to unite the porous polymer membrane and the porous support together. Examples of the method for adjusting the thickness of the porous polymer membrane include, but are not limited to: adjusting the temperature of the dispersion; and adjusting the amount of the dispersion to be applied through a T-die.

It is preferable that the porous polymer membrane have portions lying inside the pores of the porous support and thus be united with the porous support. When the porous polymer membrane and the porous support are united together, separation of the porous support from the porous polymer membrane tends to be more effectively prevented by so-called anchoring effect.

(Electrolysis Device)

The diaphragm for alkaline water electrolysis of the present embodiment can be used as a component of an alkaline water electrolysis device. That is, an example of the alkaline water electrolysis device of the present embodiment is one that includes an anode, a cathode, and the diaphragm for alkaline water electrolysis of the present embodiment, the diaphragm being placed between the anode and cathode. In a more specific example, the interior of the alkaline water electrolysis device is divided by the diaphragm for alkaline water electrolysis into an anode compartment in which the anode is placed and a cathode compartment in which the cathode is placed, and oxygen gas and hydrogen gas evolved from the electrodes are kept from being mixed. The diaphragm for alkaline water electrolysis of the present embodiment can be incorporated in a bipolar electrolytic cell easily, and allows industrial supply of a large-scale electrolytic cell capable of producing a large amount of hydrogen. The configuration of the alkaline water electrolysis device of the present embodiment is not particularly limited, as long as it includes the above-described diaphragm for alkaline water electrolysis. For example, a known electrode or electrolytic cell may be employed as appropriate. Specifically, the device may include a gas-liquid separation tank for separating evolved gas from the electrolyte solution. In addition, the device may include a capacitor or a mist separator for performing electrolysis stably. For electrolysis, the number of stacked electrolytic cells and their area can be varied as appropriate according to the amount of gas required to be generated. For example, when hydrogen is sought to be obtained at a rate of 1000 $Nm^3/hr$ by applying a current of 6 $kA/m^2$, 150 electrolytic cells each having an area of about 3 $m^2$ may be stacked together. When hydrogen is sought to be obtained at a rate of 50 $Nm^3/hr$ at the same current, 80 electrolytic cells each having an area of about 0.25 $m^2$ may be stacked together.

(Method for Electrolysis)

The method and conditions for electrolysis using the alkaline water electrolysis device of the present embodiment are not particularly limited, and known methods and conditions can be employed. For example, the interior of the alkaline water electrolysis device is filled with an alkaline solution, and a direct current is applied between the anode and the cathode. For example, an aqueous solution of sodium hydroxide or potassium hydroxide is used as the electrolyte solution. The concentration of the electrolyte solution is preferably, but not limited to, 15 mass % or more and 40 mass % or less. When the concentration of the electrolyte solution is in this range, ion conductivity of the solution is likely to be exhibited satisfactorily so that voltage loss caused by the solution is reduced.

The temperature for electrolysis is preferably, but not limited to, 60° C. or higher and 100° C. or lower. When the temperature is in this range, the ion conductivity of the solution is further improved, so that the voltage loss caused by the solution can be further reduced.

Hydrogen can be industrially produced by water electrolysis process which uses the alkaline water electrolysis device of the present embodiment and in which a variable power supply is applied to the device. That is, the method for producing hydrogen according to the present embodiment includes the step of electrolyzing alkaline water by applying a voltage to the alkaline water electrolysis device according to the present embodiment using a variable power supply. With the method for producing hydrogen according to the present embodiment, a variable power supply derived from a renewable energy source such as a large-scale wind-power generation or photovoltaic generation can be efficiently and stably converted to and stored as hydrogen. Variable power supplies can be classified into power supplies from which electricity is stably obtained and power supplies whose electricity supply vary greatly. The former can be used without particular problems, while the latter impose a heavy burden on facilities. Thus, an exemplary beneficial use of an electrolytic cell incorporating the diaphragm for alkaline water electrolysis of the present embodiment is to allow varying electricity to be converted to and stored as hydrogen. This makes it possible to use varying electricity as stable electricity.

EXAMPLE

Hereinafter, the present embodiment will be described in more detail with reference to Examples and Comparative Examples. The present embodiment is not limited to Examples given below. Methods employed for evaluation and measurement in the examples were as described below.

(1) Average Pore Size at Surface

The measurement of the average pore size at both surfaces of the porous polymer membrane was conducted using a scanning electron microscope (SEM; "Miniscope TM3000" available from Hitachi High-Technologies Corporation). First, the diaphragm for alkaline water electrolysis was cut into a 5-mm-square piece including a core material (porous support), and the piece of the diaphragm was used as a sample. This sample was subjected to Au—Pd coating using a magnetron sputtering system ("MSP-1S" available from Shinkuu Device Co., Ltd) for 1 minute. Next, this sample was set to the observation sample stage of a SEM to start the measurement. The diaphragm as a measurement sample was set in such a manner as to allow the SEM observation to be made in a direction perpendicular to the membrane surface to be observed. After the start of the measurement, image capturing was performed by adjusting the magnification of the SEM so that from 100 to 400 pores present in the observed surface of the porous polymer membrane were seen in the measurement field of view, and the capturing screen image was stored. The obtained image was binarized using an image analysis software ("WinROOF" available from MITANI CORPORATION), and the number-average of absolute maximum lengths of the respective observed pores, being 0.5 μm or more, is calculated. The arithmetic average of the calculated values was determined as the average pore size of the porous polymer membrane. This average pore size was determined for the two surfaces of the porous polymer membrane. The SEM observation was made perpendicular to the observed surface of the membrane. Openings which were continuously surrounded by the resin were regarded as pores. Openings a part of which fell outside the measurement field of view were not regarded as pores.

(2) Gas Impermeability Test

The evaluation of the gas impermeability of the diaphragm for alkaline water electrolysis was conducted using a bubble point tester ("Sartocheck Junior BP-Plus" available from Sartorius Stedim Japan K.K.). First, the diaphragm for alkaline water electrolysis was cut into an 8-cm-square piece including a core material, and the piece of the diaphragm was used as a sample. Nine such samples were cut out from 1 m2 of the diaphragm. Each sample was wet with pure water to allow pure water to enter the pores of the porous polymer membrane. Next, this sample was set to a measurement holder to start the measurement. After the start of the measurement, the upper side of the sample was pressurized with nitrogen. The nitrogen pressure at which gas bubbles began to emerge on the lower side of the sample continuously at a rate of 150 mL/min was determined as the bubble point. When the bubble point at 25° C. was 700 kPa or more, the gas impermeability was rated as "A". When the bubble point at 25° C. was 600 kPa or more and less than 700 kPa, the gas impermeability was rated as "B". When the bubble point at 25° C. was 500 kPa or more and less than 600 kPa, the gas impermeability was rated as "C". When the bubble point at 25° C. was 400 kPa or more and less than 500 kPa, the gas impermeability was rated as "D". When the bubble point at 25° C. was less than 400 kPa, the gas impermeability was rated as "E". The average of values measured for the nine samples was used as a test result.

(3) Evaluation of Average Water Permeation Pore Size

The average water permeation pore size of the diaphragm for alkaline water electrolysis was measured using an integrity testing system ("Sartocheck Junior BP-Plus" available from Sartorius Stedim Japan K.K.). First, the porous polymer membrane was cut into an 8-cm-square piece including a core material, and the piece of the membrane was used as a sample. Nine such samples were cut out from 1 m² of the diaphragm. This sample was wet with pure water to allow pure water to enter the pores of the porous polymer membrane. Next, the sample saturated with was set in a lower portion of a cylindrical pressure-resistant holder having openings at its top and bottom, and pure water was poured from above the sample so that the holder was filled with pure water. Next, the pressure-resistant holder was placed in a thermostatic chamber set at 90° C., and the measurement was started at the time when the interior of the pressure-resistant holder reached 90° C. After the start of the measurement, the water-surface side, namely, the upper side of the sample was pressurized with nitrogen. The values of the pressure and permeation rate at which pure water permeated through the sample from its lower side were recorded. The average water permeation pore size was determined by the following Hagen-Poiseuille equation using the gradient between the pressure and the water permeation rate during the period in which the pressure was between 10 kPa and 30 kPa.

$$\text{Average water permeation pore size (m)} = 32\, \eta L \mu_0 / (\varepsilon P)$$

In this equation, $\eta$ is the viscosity (Pa·S) of water, L is the thickness (m) of the porous polymer membrane, and $\mu_0$ is an apparent flow rate calculated by the following equation: $\mu_0$ (m/s)=flow rate (m³/S)/flow passage area (m²). $\varepsilon$ is the porosity and P is the pressure (Pa).

(4) Evaluation of Maximum Pore Size

The maximum pore size of the diaphragm for alkaline water electrolysis was measured using an integrity testing system ("Sartocheck Junior BP-Plus" available from Sartorius Stedim Japan K.K.). First, the porous polymer membrane was cut into an 8-cm-square piece including a core material, and the piece of the membrane was used as a sample. This sample was wet with pure water to allow pure water to enter the pores of the porous polymer membrane. The sample was set to a measurement holder. Next, the pressure-resistant vessel was placed in a thermostatic chamber set at 90° C., and the measurement was started at the time when the interior of the pressure-resistant holder reached 90° C. After the start of the measurement, the upper side of the sample was pressurized with nitrogen. The nitrogen pressure at which gas bubbles began to continuously emerge on the lower side of the sample was determined as a bubble point. The maximum pore size was determined by the following bubble point equation which is a modification of the Young-Laplace equation.

$$\text{Maximum pore size (m)} = 4\gamma \cos \theta / P$$

In this equation, $\gamma$ is the surface tension (N/m) of water, $\cos \theta$ is the contact angle (rad) between the porous polymer membrane surface and water, and P is the bubble point (Pa).

(5) Cavitation Test

The cavitation test of the diaphragm for alkaline water electrolysis was conducted using a desk-top ultrasonic cleaner ("BRANSONIC Model 5800" available from BRANSON). First, 3 L of pure water was put in the desk-top ultrasonic cleaner, and 500 mL of pure water was put in a PP (polypropylene) beaker intended for 500 mL. The PP beaker was placed on the center of the cleaner, which was powered on and operated until the water temperature reached 30° C. An 8-cm-square sample cut out from 1 m2 of the diaphragm was placed upright in a disposable cup and then subjected to ultrasonic cleaning for 60 minutes. The surface of the sample taken out of the cup was washed with pure water from a wash bottle.

The sample before and after the ultrasonic cleaning was subjected to the bubble point measurement in the same manner as in "Gas impermeability test" described above, except for the following points. That is, the bubble point at 90° C. was measured before and after the cavitation test. Nine samples were used for determining both of the bubble points before and after the cavitation test, and the lowest values among the nine respective measured values of the bubble points were used as test results.

(6) Evaluation of Cell Voltage

The evaluation of the ion permeability of the diaphragm for alkaline water electrolysis was conducted by the following procedure using a self-made alkaline water electrolysis device (see FIG. 1).

As shown in FIG. 1, an electrolytic cell 10 has a cathode compartment 1 containing a cathode (a platinum mesh electrode of 40 meshes) 11 and an anode compartment 2 containing an anode (an expanded metal-type nickel electrode in the shape of a rhombus with 1.5 mm and 2.5 mm diagonals) 21, the compartments being separated by a diaphragm for alkaline water electrolysis 3. An electrolyte solution is supplied to the electrolytic cell 10 by a pump 40 through an electrolyte solution feed line 30. Hydrogen gas evolved at the cathode 11 is delivered from the cathode compartment 1 to a cathode tank 12, while oxygen gas evolved at the anode 21 is delivered from the anode compartment 2 to an anode tank 22. Although not shown in the FIGURE, the electrolytic cell is made up of six bipolar cells connected in series, and both the anode area and cathode area in each cell are 30 cm$^2$.

The cathode compartment 1 and the anode compartment 2, which were separated by the diaphragm, were filled with a 30 wt % aqueous KOH solution having a temperature of 90° C. A direct current with a current density of 0.60 A/cm2 was applied between the cathode 11 and the anode 21 to start electrolysis operation. The potential difference between the electrodes was measured 24 hours after the start of electrolysis, and the potential difference between the electrodes was employed as the cell voltage. When the cell voltage was 1.90 V or less, the ion permeability was rated as good, while when the cell voltage was 1.91 V or more, the ion permeability was rated as poor. Water in the aqueous KOH solution was consumed for electrolysis; thus, during electrolysis, pure water was regularly added to the cathode 12 to keep constant the KOH concentration. In addition, the electrolyte solution in the electrode compartments was circulated by the pump 40 at a flow rate of 50 L/min stagnant so that oxygen gas and hydrogen gas evolved from the electrodes in the electrolytic cell did not become stagnant.

(7) Evaluation of Mode Particle Size

The mode particle size of the hydrophilic inorganic particles was determined using a laser diffraction-scattering particle size distribution analyzer ("LA-950" available from HORIBA, Ltd.). The polymer resin constituting the porous polymer membrane was dissolved away from the diaphragm for alkaline water electrolysis by using N-methyl-2-pyrrolidone as a solvent. The remaining inorganic particles were repeatedly washed three times using N-methyl-2-pyrrolidone in an amount which was 1000 or more times the weight of the inorganic particles. The washed inorganic particles were introduced into an ultrasonic cleaning containing ion-exchange water. The zirconium oxide was exposed to ultrasonic waves for 1 minute while being stirred and circulated in the washing tank. This was followed by gentle stirring for removal of air to obtain a sample. The mode particle size of the hydrophilic inorganic particles as a sample was measured as follows. That is, the mode particle size was determined from a volume-based distribution obtained by laser diffraction-scattering method conducted under the condition that the transmission intensity of a red laser (wavelength: 655 nm) was from 80 to 90% and the transmission intensity of a blue LED (wavelength: 405 nm) was from 70 to 90%. The refractive index of water was assumed to be 1.33, and the refractive index of zirconium oxide was assumed to be 2.4.

(8) Evaluation of Contact Angle

A contact angle of the diaphragm for alkaline water electrolysis was measured using "Drop Master DM-701" (available from Kyowa Interface Science Co., Ltd). In the contact angle measurement, a water contact angle was measured by θ/2 method using a 3-μL droplet in a measurement atmosphere where the temperature was 23° C. and the humidity was 65% RH. The contact angle was measured at both timings of: before the electrolysis employed in the evaluation of cell voltage described above; and 24 hours after the start of the electrolysis.

(9) Evaluation of Hydrophilicity

The hydrophilicity of the diaphragm for alkaline water electrolysis was evaluated by the difference between the contact angles of the diaphragm for alkaline water electrolysis as determined before electrolysis and after 24-hour electrolysis. When the difference was less than 5 deg, the hydrophilicity was rated as good, while when the difference was 5 deg or more, the hydrophilicity was rated as poor. The contact angle was measured according to the method described above.

(Difference in contact angle[deg])=(contact angle (before electrolysis)[deg])−(contact angle(after 24-hr electrolysis)[deg])

(10) Evaluation of Tensile Breaking Strength

The measurement was conducted at a temperature of 23° C. and under an atmosphere of humidity of 65% RH according to JIS K 7161. The diaphragm for alkaline water electrolysis was cut along the MD direction (machine direction (line direction) for coating application in membrane production) and the TD direction (direction orthogonal to the MD direction) to give a piece with a width of 10 mm and a length of 100 mm, which was used as a specimen. The specimen was subjected to a tensile test using "Autograph AGS-1kNX" (available from Shimadzu Corporation) with a chuck-to-chuck distance of 50 mm and a tensile speed of 100 mm/min. The measurement was performed five times, and the arithmetic average of the five measured values was used as a measured value of the tensile breaking strength. The tensile breaking strength was determined for both the MD direction and the TD direction.

(11) Evaluation of Tearing Strength

The measurement was conducted at a temperature of 23° C. and under an atmosphere of humidity of 65% RH according to JIS L 1096. The diaphragm for alkaline water electrolysis was cut along the MD direction and the TD direction to give a piece with a width of 100 mm and a length of 63 mm, which was used as a specimen. The tearing strength measurement was conducted according to Elmendorf tear test as follows. That is, the measurement was conducted for the specimen ten times using "Elmendorf Tear Tester" available from MYS-TESTER Company Limited, and the arithmetic average of the 10 measured values was used as a measured value of the tearing strength. The tearing strength was determined for both the MD direction and the TD direction.

(12) Evaluation of Membrane Thickness

The coating thickness is defined herein to refer to the thickness of the coating liquid applied to the substrate. The coating thickness was adjusted by the gap between the substrate and the comma coater. Specifically, a gap gauge was inserted between the substrate and comma coater, and the position of the comma coater was shifted to adjust the coating thickness. The membrane thickness refers to the thickness of the porous polymer membrane, and was measured using a dial gauge. The thickness of the porous polymer membrane was measured at intervals of 10 cm both in the MD direction and the TD direction, and the arithmetic average of the measured values was determined as the membrane thickness.

(13) Measurement of Porosity

The measurement of the porosity of the porous polymer membrane was conducted using an electronic precision balance/specific gravity measurement kit ("AUX120+SMK-401" available from Shimadzu Corporation). The open pore porosity which was determined by Archimedes method for the porous polymer membrane was employed as the porosity of the diaphragm for alkaline water electrolysis. The porosity was calculated by the equation given below. First, the porous polymer membrane washed with pure water was cut into three pieces with a size of 3 cm×3 cm, and the three pieces were used as measurement samples. W2 and W3 of the sample were measured. After that, the porous polymer membrane was left to dry in a dryer set at 50° C. for 12 hours or more, and W1 of the membrane is was measured. The porosity was determined from the values of W1, W2, and W3. The values of the porosity were determined for the three samples, and the arithmetic average of the determined values was employed as the porosity P.

Porosity $P$ (%)=$\rho/(1+\rho) \times 100$

In this equation, $\rho$ is equal to (W3−W1)/(W3−W2), where W1 is a dry weight (g) of the porous polymer membrane, W2 is a weight in water (g) of the porous polymer membrane, and W3 is a water-saturated weight (g) of the porous polymer membrane. The weight in water refers to the weight of the sample suspended by a wire in water on the balance. The water-saturated weight refers to the weight as measured in air for a sample of the porous membrane retaining water in its pores, the sample being prepared by immersing the porous polymer membrane in ethanol to impregnate the interior of the porous membrane with ethanol and then by immersing the porous membrane in pure water to displace ethanol by pure water.

(14) Evaluation of Mode Particle Size/Pore Size Ratio

The ratio of the mode particle size of the porous polymer membrane to the pore size (mode particle size/pore size ratio) was calculated by the equation given below using the result of "(1) Surface average pore size" and the result of "(5) Measurement of mode particle size". The larger of the measured values of the average pore sizes at the two surfaces was used as the surface average pore size.

(Mode particle size/pore size ratio)=(mode particle size [μm])/(surface average pore size [μm])

(15) Evaluation of Inorganic Particle Abundance (Particle Analysis)

The inorganic particle abundances at both surfaces and a cross-section of the porous polymer membrane was determined before and after the cavitation test using a scanning electron microscope (SEM; "Miniscope TM3000" available from Hitachi High-Technologies Corporation).

For both surfaces, first, the diaphragm for alkaline water electrolysis was cut into a 5-mm-square piece including a core material (porous support), and the piece of the diaphragm was used as a sample. This sample was subjected to Au—Pd coating using a magnetron sputtering system ("MSP-1S" available from Shinkuu Device Co., Ltd) for 1 minute. Next, this sample was set to the observation sample stage of a SEM to start the measurement. The setting of the diaphragm as a measurement sample was done in such a manner as to allow the SEM observation to be made in a direction perpendicular to the membrane surface to be observed. After the start of the measurement, image capturing was performed by adjusting the magnitude of the SEM to 3000 times, and the capturing screen image was stored.

For the cross-section, first, the diaphragm for alkaline water electrolysis was cut into a 5-mm-square piece including a core material (porous support), and the piece of the diaphragm was used as a sample. This sample was secured to a processing stage and BIB (Broad Ion Beam) was applied to the sample in the direction perpendicular to the sample surface to expose the cross-section of the sample. The BIB processing was performed using a BIB apparatus ("SM-09010" available from JEOL Ltd.) and argon ions (Ar+) at an accelerating voltage of 3.8 kV. The processed sample was subjected to osmium (Os) plasma coating ("HPC-1S Osmium Coater" available from Shinkuu Device Co., Ltd.) for 3 seconds, and the resulting product was used as an observation sample. Next, this sample was set to the observation sample stage of a SEM to start the measurement. The diaphragm as a measurement sample was set in such a manner as to allow the SEM observation to be made in a direction perpendicular to the cross-section to be observed. After the start of the measurement, image capturing was performed by adjusting the magnitude of the SEM to 2000 times, and the capturing screen image was stored.

The obtained images of both surfaces and the cross-section were each converted, using a particle analysis software ("Particle Analysis VERSION 3.5" available from NIPPON STEEL & SUMIKIN TECHNOLOGY Co., Ltd.), to a gray scale image made up of pixels having a brightness in the range of from 0 to 255. Hereinafter, the total number of the pixels refers to the total number of the pixels in the converted gray scale image. Subsequently, a brightness distribution graph (ordinate: the number of pixels, abscissa: the brightness) was obtained. The brightness at which the number of pixels cumulated from a brightness of 0 reached 25% of the total number of pixels was defined as a lower threshold, while the brightness at which the number of pixels cumulated from a brightness of 0 reached 99% was defined as an upper threshold. Next, level correction was executed so that the lower threshold and the upper threshold defined above were corrected to a brightness of 0 and a brightness of 255, respectively. The proportion of the number of pixels having a brightness of 125 or more after the level correction to the total number of the pixels was determined as the inorganic particle abundance (%). The inorganic particle abundances were measured for both surfaces and a cross-section of a region up to 50 μm from each surface of the nine respective samples both before and after the cavitation test. The average of the measured values was used as a measurement result. The ratio of decrease in the inorganic particle abundance was determined by comparing the values (%) obtained for the same portion before and after the cavitation test. When the ratio of decrease was less than 0.10, a rating of "A" was given. When the ratio of decrease was less than 0.20, a rating of "B" was given. When the ratio of decrease was 0.20 or more, a rating of "C" was given. The ratio of decrease in the inorganic particle abundance was determined by the following equation using the values of the abundances of the inorganic particles before and after the cavitation test.

Ratio of decrease=$(\alpha-\beta)/\alpha$

In this equation, α represents the inorganic particle abundance (%) before the cavitation test, and β represents the inorganic particle abundance (%) after the cavitation test.

(16) Variable Current Test

A 3000-hour electrolysis experiment was performed by using an electrolytic cell having the same configuration as that for the cell voltage measurement described above and by applying a variable current represented by a sine curve with a frequency of 30 Hz and an amplitude of from 5 to 6 kA/m2. For the diaphragm taken out of the cell after the experiment, the bubble point at 90° C. was measured in the same manner as in "(5) Cavitation test". At the same time, the inorganic particle abundance and the ratio of decrease were also evaluated in the same manner as in (15). The ratings were also given by using the same criteria.

Example 1

In a 1000 mL ball mill pot containing 1 kg of SUS balls with a diameter of 0.5 mm there were placed 135 g of zirconium oxide ("EP zirconium oxide" available from DAIICHI KIGENSO KAGAKU KOGYO, CO., LTD.) and 210 g of N-methyl-2-pyrrolidone (available from Wako Pure Chemical Industries, Ltd.). They were stirred and dispersed at a rotation speed of 70 rpm at an ambient temperature of 25° C. for 3 hours to obtain a mixture. The mixture obtained was filtered through a stainless steel sieve (of 30 meshes) to separate the balls from the mixture. To the mixture from which the balls were separated there were added 45 g of polysulfone ("Udel"™ available from Solvay Advanced Polymers L.L.C.) and 18 g of polyvinylpyrrolidone (having a weight-average molecular weight (Mw) of 900000 and available from Wako Pure Chemical Industries, Ltd.), which were dissolved by stirring using a three-one motor at 60° C. for 12 hours, giving a coating liquid having the following material composition.

Polysulfone: 15 parts by mass
Polyvinylpyrrolidone: 6 parts by mass
N-methyl-2-pyrrolidone: 70 parts by mass
Zirconium oxide: 45 parts by mass This coating liquid was applied to both surfaces of a substrate, which was a polyphenylene sulfide mesh (available from Nippon Clever Corporation and having a thickness of 280 μm, a mesh opening of 358 μm, and a wire diameter of 150 μm), by means of a comma coater so that the coating thickness would be 150 μm on each surface of the substrate. Immediately after the application, the substrate, to which the coating liquid was applied, was exposed to vapor from a coagulation bath holding a 30° C. pure water/isopropanol mixture (available from Wako Pure Chemical Industries, Ltd. and having a pure water/isopropanol ratio of 50/50 (v/v)) for 1 minute. Immediately after that, the substrate, to which the coating liquid was applied, was immersed in the coagulation bath for 4 minutes. Polysulfone was thus coagulated to form a coating on the surfaces of the substrate. Subsequently, the coating was thoroughly washed with pure water to obtain a diaphragm for alkaline water electrolysis including a porous polymer membrane.

The average pore sizes of the porous polymer membrane were 1.1 μm at both surfaces of the membrane. The ratio of the mode particle size of the inorganic particles to the average pore size of the porous polymer membrane (mode particle size/average pore size) was 4.9. The cell voltage after 24-hour electrolysis measured for the device employing the porous polymer membrane was 1.78, which was good. The bubble points before and after the cavitation test were 150 kPa and 145 kPa, respectively. The inorganic particle abundances at both surfaces of the membrane before and after cavitation test were 18.5% and 17.1%, respectively, and the inorganic particle abundances at a cross-section of the membrane before and after the cavitation tests were 19.1% and 17.3%, respectively. The bubble points before and after the variable current test were 150 kPa and 140 kPa, respectively. The inorganic particle abundances at both surfaces of the membrane before the variable and after current test were 18.5% and 16.9%, respectively, and the inorganic particle abundances at a cross-section of the membrane before the variable and after the current test were 19.1% and 17.1%, respectively.

Example 2

In a 1000 mL ball mill pot containing 1 kg of SUS balls with a diameter of 0.5 mm there were placed 135 g of zirconium oxide ("EP zirconium oxide" available from DAIICHI KIGENSO KAGAKU KOGYO, CO., LTD.) and 210 g of N-methyl-2-pyrrolidone (available from Wako Pure Chemical Industries, Ltd.). They were stirred and dispersed at a rotation speed of 70 rpm at an ambient temperature of 25° C. for 3 hours to obtain a mixture. The mixture obtained was filtered through a stainless steel sieve (of 30 meshes) to separate the balls from the mixture. To the mixture from which the balls were separated there were added 45 g of polysulfone ("Udel"™ available from Solvay Advanced Polymers L.L.C.) and 18 g of polyvinylpyrrolidone (having a weight-average molecular weight (Mw) of 900000 and available from Wako Pure Chemical Industries, Ltd.), which were dissolved by stirring using a three-one motor at 60° C. for 12 hours, giving a coating liquid having the following material composition.

Polysulfone: 15 parts by mass
Polyvinylpyrrolidone: 6 parts by mass
N-methyl-2-pyrrolidone: 70 parts by mass
Zirconium oxide: 45 parts by mass This coating liquid was applied to both surfaces of a substrate, which was a polyphenylene sulfide mesh (available from Nippon Clever Corporation and having a thickness of 280 μm, a mesh opening of 358 μm, and a wire diameter of 150 μm), by means of a comma coater so that the coating thickness would be 150 μm on each surface of the substrate. Immediately after the application, the substrate, to which the coating liquid was applied, was exposed to vapor from a coagulation bath holding a 30° C. pure water/isopropanol mixture (available from Wako Pure Chemical Industries, Ltd. and having a pure water/isopropanol ratio of 50/50 (v/v)) for 2 minutes. Immediately after that, the substrate, to which the coating liquid was applied, was immersed in the coagulation bath for 4 minutes. Polysulfone was thus coagulated to form a coating on the surfaces of the substrate. Subsequently, the coating was thoroughly washed with pure water to obtain a diaphragm for alkaline water electrolysis including a porous polymer membrane.

The average pore sizes of the porous polymer membrane were 1.9 μm at one surface of the membrane and 2.0 μm at the other surface of the membrane. The ratio of the mode particle size of the inorganic particles to the average pore size of the porous polymer membrane (mode particle size/average pore size) was 2.5. The cell voltage after 24-hour electrolysis measured for the device employing the porous polymer membrane was 1.86, which was good. The bubble points before and after the cavitation test were 120 kPa and 105 kPa, respectively. The inorganic particle abundances at both surfaces of the membrane before and after the cavitation test were 19.6% and 16.5%, respectively, and the inorganic particle abundances at a cross-section of the membrane before and after the cavitation test were 19.2% and 17.5%, respectively. The bubble points before and after the variable current test were 120 kPa and 100 kPa, respectively. The inorganic particle abundances at both surfaces of the membrane before and after the variable current test were 19.6% and 17.4%, respectively, and the inorganic particle abundances at a cross-section of the membrane before and after the variable current test were 19.2% and 17.3%, respectively.

Example 3

In a 1000 mL ball mill pot containing 1 kg of SUS balls with a diameter of 0.5 mm there were placed 135 g of zirconium oxide ("EP zirconium oxide" available from DAIICHI KIGENSO KAGAKU KOGYO, CO., LTD.) and 210 g of N-methyl-2-pyrrolidone (available from Wako Pure Chemical Industries, Ltd.). They were stirred and dispersed at a rotation speed of 70 rpm at an ambient temperature of 25° C. for 3 hours to obtain a mixture. The mixture obtained was filtered through a stainless steel sieve (of 30 meshes) to separate the balls from the mixture. To the mixture from which the balls were separated there were added 45 g of polysulfone ("Udel"™ available from Solvay Advanced Polymers L.L.C.) and 18 g of polyvinylpyrrolidone (having a weight-average molecular weight (Mw) of 900000 and available from Wako Pure Chemical Industries, Ltd.), which were dissolved by stirring using a three-one motor at 60° C. for 12 hours, giving a coating liquid having the following material composition.

Polysulfone: 15 parts by mass
Polyvinylpyrrolidone: 6 parts by mass
N-methyl-2-pyrrolidone: 70 parts by mass
Zirconium oxide: 45 parts by mass This coating liquid was applied to both surfaces of a substrate, which was a polyphenylene sulfide mesh (available from Nippon Clever Corporation and having a thickness of 280 µm, a mesh opening of 358 µm, and a wire diameter of 150 µm), by means of a comma coater so that the coating thickness would be 150 µm on each surface of the substrate. Immediately after the application, the substrate, to which the coating liquid was applied, was exposed to vapor from a coagulation bath holding a 30° C. pure water/N-methyl-2-pyrrolidone mixture (50/50 (v/v)) for 30 seconds. Immediately after that, the substrate, to which the coating liquid was applied, was immersed in the coagulation bath for 4 minutes. Polysulfone was thus coagulated to form a coating on the surfaces of the substrate. Subsequently, the coating was thoroughly washed with pure water to obtain a diaphragm for alkaline water electrolysis including a porous polymer membrane.

The average pore sizes of the porous polymer membrane were 0.6 µm at one surface of membrane and 0.8 µm at the other surface of the membrane. The ratio of the mode particle size of the inorganic particles to the average pore size of the porous polymer membrane (mode particle size/average pore size) was 7.0. The cell voltage after 24-hour electrolysis measured for the device employing the porous polymer membrane was 1.79 V, which was good. The bubble points before and after the cavitation test were 130 kPa and 120 kPa, respectively. The inorganic particle abundances at both surfaces of the membrane before and after the cavitation test were 17.5% and 16.7%, respectively, and the inorganic particle abundances at a cross-section of the membrane before and after the cavitation test were 18.1% and 17.2%, respectively. The bubble points before and after the variable current test were 130 kPa and 120 kPa, respectively. The inorganic particle abundances at both surfaces of the membrane before and after the variable current test were 17.5% and 16.9%, respectively, and the inorganic particle abundances at a cross-section of the membrane before and after the variable current test were 18.1% and 17.5%, respectively.

Example 4

In a 1000 mL ball mill pot containing 1 kg of SUS balls with a diameter of 0.5 mm there were placed 135 g of zirconium oxide ("EP zirconium oxide" available from DAIICHI KIGENSO KAGAKU KOGYO, CO., LTD.) and 210 g of N-methyl-2-pyrrolidone (available from Wako Pure Chemical Industries, Ltd.). They were stirred and dispersed at a rotation speed of 70 rpm at an ambient temperature of 25° C. for 3 hours to obtain a mixture. The mixture obtained was filtered through a stainless steel sieve (of 30 meshes) to separate the balls from the mixture. To the mixture from which the balls were separated there were added 45 g of polysulfone ("Udel"™ available from Solvay Advanced Polymers L.L.C.) and 18 g of polyvinylpyrrolidone (having a weight-average molecular weight (Mw) of 900000 and available from Wako Pure Chemical Industries, Ltd.), which were dissolved by stirring using a three-one motor at 60° C. for 12 hours, giving a coating liquid having the following material composition.

Polysulfone: 15 parts by mass
Polyvinylpyrrolidone: 6 parts by mass
N-methyl-2-pyrrolidone: 70 parts by mass
Zirconium oxide: 45 parts by mass This coating liquid was applied to both surfaces of a substrate, which was a polyphenylene sulfide mesh (available from Nippon Clever Corporation and having a thickness of 280 µm, a mesh opening of 358 µm, and a wire diameter of 150 µm), by means of a comma coater so that the coating thickness would be 50 µm on each surface of the substrate. Immediately after the application, the substrate, to which the coating liquid was applied, was exposed to vapor from a coagulation bath holding a 30° C. pure water/N-methyl-2-pyrrolidone mixture (50/50 (v/v)) for 1 minute. Immediately after that, the substrate, to which the coating liquid was applied, was immersed in the coagulation bath for 4 minutes. Polysulfone was thus coagulated to form a coating on the surfaces of the substrate. Subsequently, the coating was thoroughly washed with pure water to obtain a diaphragm for alkaline water electrolysis including a porous polymer membrane.

The average pore sizes of the porous polymer membrane were 1.5 µm at one surface of the membrane and 1.7 µm at the other surface of the membrane. The ratio of the mode particle size of the inorganic particles to the average pore size of the porous polymer membrane (mode particle size/average pore size) was 3.4. The result cell voltage after 24-hour electrolysis measured for the device employing the porous polymer membrane was 1.88 V, which was good. The bubble points before and after the cavitation test were 110 kPa and 105 kPa, respectively. The inorganic particle abundances at both surfaces of the membrane before and after the cavitation test were 15.3% and 13.4%, respectively, and the inorganic particle abundances at a cross-section of the membrane before and after the cavitation test were 15.4% and 13.6%, respectively. The bubble points before and after the variable current test were 110 kPa and 100 kPa, respectively. The inorganic particle abundances at both surfaces of the membrane before and after the variable current test were 15.3% and 13.2%, respectively, and the inorganic particle abundances at a cross-section of the membrane before and after the variable current test were 15.4% and 13.5%, respectively.

Comparative Example 1

To 210 g of N-methyl-2-pyrrolidone (available from Wako Pure Chemical Industries, Ltd.) were added 45 g of polysulfone ("Udel"™ available from Solvay Advanced Polymers L.L.C.) and 18 g of polyvinylpyrrolidone (having a weight-average molecular weight (Mw) of 900000 and available from Wako Pure Chemical Industries, Ltd.), which were dissolved by stirring using a three-one motor at 60° C. for 12 hours, giving a coating liquid having the following material composition.

Polysulfone: 15 parts by mass
Polyvinylpyrrolidone: 6 parts by mass
N-methyl-2-pyrrolidone: 70 parts by mass This coating liquid was applied to both surfaces of a substrate, which was a polyphenylene sulfide mesh (available from Nippon Clever Corporation and having a thickness of 280 µm, a mesh opening of 358 µm, and a wire diameter of 150 µm), by means of a comma coater so that the coating thickness would be 150 µm on each surface of the substrate. Immediately after the application, the substrate, to which the coating liquid was applied, was exposed to vapor from a coagulation bath holding a 30° C. pure water/isopropanol mixture (available from Wako Pure Chemical Industries, Ltd. and having a pure water/isopropanol ratio of 50/50 (v/v)) for 1 minute. Immediately after that, the substrate, to which the coating liquid was applied, was immersed in the coagulation bath for 4 minutes. Polysulfone was thus coagulated to form a coating on the surfaces of the substrate. Subsequently, the coating was thoroughly washed with pure water to obtain a diaphragm for alkaline water electrolysis including a porous polymer membrane.

The average pore sizes of the porous polymer membrane were 0.8 µm at one surface of the membrane and 1.1 µm of the other surface of the membrane. This porous polymer membrane did not contain hydrophilic inorganic particles. The cell voltage after 24-hour electrolysis measured for the device employing the porous polymer membrane was a high value of 2.28 V, which was a poor result.

Comparative Example 2

In a 1000 mL ball mill pot containing 1 kg of SUS balls with a diameter of 0.5 mm there were placed 135 g of zirconium oxide ("RC-100 zirconium oxide" available from DAIICHI KIGENSO KAGAKU KOGYO, CO., LTD.) and 210 g of N-methyl-2-pyrrolidone (available from Wako Pure Chemical Industries, Ltd.). They were dispersed at a rotation speed of 70 rpm at an ambient temperature of 25° C. for 3 hours to obtain a mixture. The mixture obtained was filtered through a stainless steel sieve (of 30 meshes) to separate the balls from the mixture. To the mixture from which the balls were separated there were added 45 g of polysulfone ("Udel"™ available from Solvay Advanced Polymers L.L.C.) and 30 g of polyvinylpyrrolidone (having a weight-average molecular weight (Mw) of 900000 and available from Wako Pure Chemical Industries, Ltd.), which were dissolved by stirring using a three-one motor at 60° C. for 12 hours, giving a coating liquid having the following material composition.

Polysulfone: 15 parts by mass
Polyvinylpyrrolidone: 10 parts by mass
N-methyl-2-pyrrolidone: 70 parts by mass
Zirconium oxide: 45 parts by mass This coating liquid was applied to both surfaces of a substrate, which was a polyphenylene sulfide mesh (available from Nippon Clever Corporation and having a thickness of 280 µm, a mesh opening of 358 µm, and a wire diameter of 150 µm), by means of a comma coater so that the coating thickness would be 150 µm on each surface of the substrate. Immediately after the application, the substrate, to which the coating liquid was applied, was exposed to vapor from a coagulation bath holding a 30° C. pure water/N-methyl-2-pyrrolidone mixture (50/50 (v/v)) for 3 minutes. Immediately after that, the substrate, to which the coating liquid was applied, was immersed in the coagulation bath for 4 minutes. Polysulfone was thus coagulated to form a coating on the surfaces of the substrate. Subsequently, the coating was thoroughly washed with pure water to obtain a diaphragm for alkaline water electrolysis including a porous polymer membrane.

The average pore sizes of the porous polymer membrane were 3.6 µm at one surface of the membrane and 3.8 µm at the other surface of the membrane. The ratio of the mode particle size of the inorganic particles to the average pore size of the porous polymer membrane (mode particle size/average pore size) was 1.7. The cell voltage after 24-hour electrolysis measured for the device employing the porous polymer membrane was 1.93 V, which was a poor result. Both of the bubble points before and after the cavitation test were less than 10 kPa. The inorganic particle abundances at both surfaces of the membrane before and after the cavitation test were 19.4% and 3.3%, respectively, and the inorganic particle abundances at a cross-section of the membrane before and after the cavitation test was 18.7% and 7.8%, respectively. The bubble points before and after the variable current test were less than 10 kPa. The inorganic particle abundances at both surfaces of the membrane before and after the variable current test were 19.4% and 7.7%, respectively, and the inorganic particle abundances at a cross-section of the membrane before and after the variable current test were 18.7% and 7.7%, respectively.

Comparative Example 3

In a 1000 mL ball mill pot containing 1 kg of SUS balls with a diameter of 0.5 mm there were placed 135 g of zirconium oxide ("RC-100 zirconium oxide" available from DAIICHI KIGENSO KAGAKU KOGYO, CO., LTD.) and 210 g of N-methyl-2-pyrrolidone (available from Wako Pure Chemical Industries, Ltd.). They were stirred and dispersed at a rotation speed of 70 rpm at an ambient temperature of 25° C. for 3 hours to obtain a mixture. The mixture obtained was filtered through a stainless steel sieve (of 30 meshes) to separate the balls from the mixture. To the mixture from which the balls were separated there were added 45 g of polysulfone ("Udel"™ available from Solvay Advanced Polymers L.L.C.) and 30 g of polyvinylpyrrolidone (having a weight-average molecular weight (Mw) of 900000 and available from Wako Pure Chemical Industries, Ltd.), which were dissolved by stirring using a three-one motor at 60° C. for 12 hours, giving a coating liquid having the following material composition.

Polysulfone: 15 parts by mass
Polyvinylpyrrolidone: 10 parts by mass
N-methyl-2-pyrrolidone: 70 parts by mass
Zirconium oxide: 45 parts by mass This coating liquid was applied to both surfaces of a substrate, which was a polyphenylene sulfide mesh (available from Nippon Clever Corporation and having a thickness of 280 μm, a mesh opening of 358 μm, and a wire diameter of 150 μm), by means of a comma coater so that the coating thickness would be 100 μm on each surface of the substrate. Immediately after the application, the substrate, to which the coating liquid was applied, was exposed to vapor from a coagulation bath holding a 30° C. pure water/isopropanol mixture (available from Wako Pure Chemical Industries, Ltd. and having a pure water/isopropanol ratio of 50/50 (v/v)) for 2 minutes. Immediately after that, the substrate, to which the coating liquid was applied, was immersed in the coagulation bath for 4 minutes. Polysulfone was thus coagulated to form a coating on the surfaces of the substrate. Subsequently, the coating was thoroughly washed with pure water to obtain a diaphragm for alkaline water electrolysis including a porous polymer membrane.

The average pore sizes of the porous polymer membrane were 2.8 μm at one surface of the membrane and 2.9 μm at the other surface of the membrane. The ratio of the mode particle size of the inorganic particles to the average pore size of the porous polymer membrane (mode particle size/average pore size) was 2.0. The cell voltage after 24-hour electrolysis measured for the device employing the porous polymer membrane was 1.91 V, which was a poor result. The bubble points before and after the cavitation test were 40 kPa and 15 kPa, respectively. The inorganic particle abundances at both surfaces of the membrane before and after the cavitation test were 17.8% and 4.3%, respectively, and the inorganic particle abundances at a cross-section of the membrane before and after the cavitation test were 18.0% and 8.4%, respectively. The bubble points before and after the variable current test were 40 kPa and 20 kPa, respectively. The inorganic particle abundances at both surfaces of the membrane before and after the variable current test were 17.8% and 5.0%, respectively, and the inorganic particle abundances at a cross-section of the membrane before and after the variable current test were 18.0% and 8.4%, respectively.

Comparative Example 4

In a 1000 mL ball mill pot containing 1 kg of SUS balls with a diameter of 0.5 mm there were placed 135 g of zirconium oxide ("RC-100 zirconium oxide", DAIICHI KIGENSO KAGAKU KOGYO, CO., LTD.) and 210 g of N-methyl-2-pyrrolidone (available from Wako Pure Chemical Industries, Ltd.). They were stirred and dispersed at a rotation speed of 70 rpm at an ambient temperature of 25° C. for 3 hours to obtain a mixture. The mixture obtained was filtered through a stainless steel sieve (of 30 meshes) to separate the balls from the mixture. To the mixture from which the balls were separated there were added 45 g of polysulfone ("Udel"™ available from Solvay Advanced Polymers L.L.C.) and 30 g of polyvinylpyrrolidone (having a weight-average molecular weight (Mw) of 900000 and available from Wako Pure Chemical Industries, Ltd.), which were dissolved by stirring using a three-one motor at 60° C. for 12 hours, giving a coating liquid having the following material composition.

Polysulfone: 15 parts by mass
Polyvinylpyrrolidone: 10 parts by mass
N-methyl-2-pyrrolidone: 70 parts by mass
Zirconium oxide: 45 parts by mass This coating liquid was applied to both surfaces of a substrate, which was a polyphenylene sulfide mesh (available from Nippon Clever Corporation and having a thickness of 280 μm, a mesh opening of 358 μm, and a wire diameter of 150 μm), by means of a comma coater so that the coating thickness would be 200 μm on each surface of the substrate. Immediately after the application, the substrate, to which the coating liquid was applied, was exposed to vapor from a coagulation bath holding a 30° C. pure water/isopropanol mixture (available from Wako Pure Chemical Industries, Ltd. and having a pure water/isopropanol ratio of 50/50 (v/v)) for 2 minutes. Immediately after that, the substrate, to which the coating liquid was applied, was immersed in the coagulation bath for 4 minutes. Polysulfone was thus coagulated to form a coating on the surfaces of the substrate. Subsequently, the coating was thoroughly washed with pure water to obtain a diaphragm for alkaline water electrolysis including a porous polymer membrane.

The average pore sizes of the porous polymer membrane were 2.4 μm at one surface of the membrane and 2.6 μm at the other surface of the membrane. The ratio of the mode particle size of the inorganic particles to the average pore size of the porous polymer membrane (mode particle size/average pore size) was 2.2. The cell voltage after 24-hour electrolysis measured for the device employing the porous polymer membrane was 2.13 V, which was a poor result. The bubble points before and after the cavitation test were 60 kPa and 20 kPa, respectively. The inorganic particle abundances at both surfaces of the membrane before and after the cavitation test were 18.3% and 4.8%, respectively, and the inorganic particle abundances at a cross-section of the membrane before and after the cavitation test were 18.1% and 9.1%, respectively. The bubble points before and after the variable current test were 60 kPa and 25 kPa, respectively. The inorganic particle abundances at both surfaces of the membrane before and after the variable current test were 18.3% and 3.9%, respectively, and the inorganic particle abundances at a cross-section of the membrane before and after the variable current test were 18.1% and 9.4%, respectively.

The production conditions, evaluation results etc. of diaphragms of Examples and Comparative Examples are shown in Table 1 and Table 2.

TABLE 1

|  | Unit | Example 1 | Example 2 | Example 3 | Example 4 | Comparative Example 1 | Comparative Example 2 | Comparative Example 3 | Comparative Example 4 |
|---|---|---|---|---|---|---|---|---|---|
| Average pore size at surface 1 | μm | 1.1 | 1.9 | 0.6 | 1.5 | 0.8 | 3.6 | 2.8 | 2.4 |
| Average pore size at surface 2 | μm | 1.1 | 2.0 | 0.8 | 1.7 | 1.1 | 3.8 | 2.9 | 2.6 |
| Thickness | μm | 540 | 580 | 550 | 330 | 610 | 580 | 510 | 660 |
| Porosity | % | 45 | 43 | 34 | 50 | 32 | 40 | 35 | 46 |
| Mode particle size | μm | 5.4 | 5.0 | 5.6 | 5.8 | N.A. | 6.3 | 5.9 | 5.7 |
| Mode particle size/Average pore size ratio | — | 4.9 | 2.5 | 7.0 | 3.4 | N.A. | 1.7 | 2.0 | 2.2 |

TABLE 1-continued

|  |  | Unit | Example 1 | Example 2 | Example 3 | Example 4 | Comparative Example 1 | Comparative Example 2 | Comparative Example 3 | Comparative Example 4 |
| --- | --- | --- | --- | --- | --- | --- | --- | --- | --- | --- |
| Cell voltage (After 24 hr) | | V | 1.78 | 1.86 | 1.79 | 1.88 | 2.28 | 1.93 | 1.91 | 2.13 |
| Contact angle (Before electrolysis) | | deg | 41.7 | 41.0 | 39.6 | 42.2 | 86.6 | 42.7 | 41.3 | 43.8 |
| Contact angle (After 24 hr) | | deg | 42.1 | 41.5 | 40.2 | 43.5 | 86.7 | 53.3 | 49.2 | 52.7 |
| Hydrophilicity evaluation | | deg | 0.4 | 0.5 | 0.6 | 1.3 | 0.1 | 10.6 | 7.9 | 8.9 |
| Tensile breaking strength (MD/TD) | | N | 92/101 | 98/97 | 103/101 | 100/101 | 94/104 | 92/101 | 101/99 | 94/100 |
| Tearing strength (MD/TD) | | N | 35/38 | 45/43 | 36/45 | 41/37 | 34/43 | 35/35 | 42/38 | 45/36 |
| Gas impermeability | | — | A | C | B | B | E | A | D | B |
| Average water permeation pore size | | μm | 0.4 | 0.5 | 0.2 | 0.6 | 0.4 | 0.7 | 0.6 | 0.6 |
| Maximum pore size | | μm | 1.2 | 1.5 | 1.4 | 1.6 | 18.0< | 18.0< | 4.5 | 3.0 |
| Cavitation test | Bubble point Before | kPa | 150 | 120 | 130 | 110 | <10 | <10 | 40 | 60 |
| | Bubble point After | kPa | 145 | 105 | 120 | 105 | <10 | <10 | 15 | 20 |
| | Abundance of hydrophilic inorganic particles (Surfaces) Before | % | 18.5 | 19.6 | 17.5 | 15.3 | — | 19.4 | 17.8 | 18.3 |
| | Abundance of hydrophilic inorganic particles (Surfaces) After | % | 17.1 | 16.5 | 16.7 | 13.4 | — | 3.3 | 4.3 | 4.8 |
| | Ratio of decrease | — | 0.08 | 0.16 | 0.05 | 0.12 | — | 0.83 | 0.76 | 0.74 |
| | Rating | — | A | B | A | B | — | C | C | C |
| | Abundance of hydrophilic inorganic particles (Cross-section) Before | % | 19.1 | 19.2 | 18.1 | 15.4 | — | 18.7 | 18.0 | 18.1 |
| | Abundance of hydrophilic inorganic particles (Cross-section) After | % | 17.3 | 17.5 | 17.2 | 13.6 | — | 7.8 | 8.4 | 9.1 |
| | Ratio of decrease | — | 0.09 | 0.09 | 0.05 | 0.12 | — | 0.58 | 0.53 | 0.50 |
| | Rating | — | A | A | A | B | — | C | C | C |
| Variable current test | Bubble point Before | kPa | 150 | 120 | 130 | 110 | <10 | <10 | 40 | 60 |
| | Bubble point After | kPa | 140 | 100 | 120 | 100 | <10 | <10 | 20 | 25 |
| | Abundance of hydrophilic inorganic particles (Surfaces) Before | % | 18.5 | 19.6 | 17.5 | 15.3 | — | 19.4 | 17.8 | 18.3 |
| | Abundance of hydrophilic inorganic particles (Surfaces) After | % | 16.9 | 17.4 | 16.9 | 13.2 | — | 4.3 | 5.0 | 3.9 |
| | Ratio of decrease | — | 0.09 | 0.11 | 0.03 | 0.14 | — | 0.78 | 0.72 | 0.79 |
| | Rating | — | A | B | A | B | — | C | C | C |
| | Abundance of hydrophilic inorganic particles (Cross-section) Before | % | 19.1 | 19.2 | 18.1 | 15.4 | — | 18.7 | 18.0 | 18.1 |
| | Abundance of hydrophilic inorganic particles (Cross-section) After | % | 17.1 | 17.3 | 17.5 | 13.5 | — | 7.7 | 8.4 | 9.4 |
| | Ratio of decrease | — | 0.10 | 0.10 | 0.03 | 0.12 | — | 0.59 | 0.53 | 0.48 |
| | Rating | — | B | B | A | B | — | C | C | C |

TABLE 2

|  |  | Unit | Example 1 | Example 2 | Example 3 | Example 4 | Comparative Example 1 | Comparative Example 2 | Comparative Example 3 | Comparative Example 4 |
| --- | --- | --- | --- | --- | --- | --- | --- | --- | --- | --- |
| Composition of coating liquid | Polymer resin | — | PSF | PSF | PSF | PSF | PSF | PSF | PSF | PSF |
| | | Parts by mass | 15 | 15 | 15 | 15 | 15 | 15 | 15 | 15 |
| | PVP | Parts by mass | 6 | 6 | 6 | 6 | 6 | 10 | 10 | 10 |
| | NMP | Parts by mass | 70 | 70 | 70 | 70 | 70 | 70 | 70 | 70 |
| | $ZrO_2$ (Grade) | — | EP | EP | EP | EP | — | RC100 | RC100 | RC100 |
| | | Parts by mass | 45 | 45 | 45 | 45 | 0 | 45 | 45 | 45 |
| Coagulation bath | Proportion (Composition) | — | H2O/IPA | H2O/IPA | H2O/NMP | H2O/NMP | H2O/IPA | H2O/NMP | H2O/IPA | H2O/IPA |
| | | v/v | 50/50 | 50/50 | 50/50 | 50/50 | 50/50 | 50/50 | 50/50 | 50/50 |
| | Temperature | °C. | 38.0 | 41.0 | 39.9 | 40.5 | 38.7 | 40.1 | 41.0 | 40.6 |
| Coating thickness | | μm | 150 | 150 | 150 | 50 | 150 | 150 | 100 | 200 |
| Vapor exposure time | | min | 1.0 | 2.0 | 0.5 | 1.0 | 1.0 | 3.0 | 2.0 | 2.0 |
| Coagulation bath immersion time | | min | 4.0 | 4.0 | 4.0 | 4.0 | 4.0 | 4.0 | 4.0 | 4.0 |

Abbreviations used in the tables are as follows.

PSF: Polysulfone, PVP: Polyvinylpyrrolidone, NMP: N-methyl-2-pyrrolidone, ZrO2: Zirconium oxide Examples 5 to 10

Diaphragms for alkaline water electrolysis each including a porous polymer membrane were fabricated in the same manner as in Example 1 according to the coating liquid compositions and membrane production conditions which are shown in Table 4. The results of various measurements performed for the porous polymer membranes are shown in Table 3. The polymer resins used in these examples are as follows.

PPSF: Polyphenylsulfone, "Radel R-5000"™, available from Solvay Advanced Polymers L.L.C.

PES: Polyethersulfone, "Veradel 3200"™, available from Solvay Advanced Polymers L.L.C.

Comparative Examples 5 to 8 and Comparative Example 10

Diaphragms for alkaline water electrolysis each including a porous polymer membrane were fabricated in the same manner as in Example 1 according to the coating liquid compositions and membrane production conditions which are shown in Table 4. The results of various measurements performed for the porous membranes are shown in Table 3.

Comparative Example 9

A porous membrane produced in the same manner as in Comparative Example 1 was subjected to hydrophilization and zirconium oxide deposition in the same manner as in the method described in Example 7 of Japanese Patent Laid-Open No. 2014-12889. Specifically, the porous membrane as obtained in Comparative Example 1 was immersed in and wet with 2-propanol, and the porous membrane undried was then immersed in an aqueous solution (concentration: 1.0 wt %) of polyvinyl alcohol (PVA, degree of polymerization: 1500) and left for displacement at room temperature for 60 minutes. After that, this porous membrane was immersed in a crosslinking solution prepared by mixing 30 g of an aqueous solution of glutaraldehyde (concentration: 25 wt %), 5 g of 6 molar hydrochloric acid, and 250 g of pure water, and was thus allowed to undergo a crosslinking reaction for 1 hour. Next, the porous membrane was taken out of the crosslinking solution and washed with pure water five times, after which the wet porous membrane was secured to a SUS frame with a clip and dried with a circulating hot air dryer set at 50° C. for 3 hours. Thus, a hydrophilized porous membrane was obtained. Besides this, a solution obtained by dissolving 7.0 g of hexafluorozirconic acid (available from MORITA CHEMICAL INDUSTRIES CO., LTD., concentration: 40%) in 65.0 g of pure water and a solution obtained by dissolving 0.6 g of boric acid (available from Wako Pure Chemical Industries, Ltd.) in 20.0 g of pure water were mixed to prepare a solution for zirconium oxide deposition. The hydrophilized porous membrane (80-mm-square piece) was immersed and left in 90.0 g of this solution at 25° C. for 100 hours to deposit $ZrO_2$ on the microporous membrane. Subsequently, the porous membrane was taken out of the solution, and the wet porous membrane was secured to a SUS frame with a clip and heated with a circulating hot air dryer set at 50° C. for 60 minutes. Thus, a $ZrO_2$-containing porous membrane was obtained. The results of various measurements performed for the obtained porous membrane are shown in Table 3.

Comparative Examples 11 to 13

A porous polymer membrane was formed on one surface of a substrate in the same manner as in Example 1, except for casting the coating liquid only on one surface of the comma coater and employing the coating liquid compositions and membrane production conditions which are denoted by (1) in Table 4. After that, the porous membrane obtained was further passed through the comma coater, and another porous polymer membrane was formed on the other surface of the substrate in the same manner as the porous membrane formed on the one surface, except for employing the coating liquid compositions and membrane production conditions which are denoted by (2) instead of those denoted by (1). In Comparative Example 11, the coating liquid application and membrane formation were performed only on one surface of the substrate. The results of various measurements performed for the porous polymer membranes are shown in Table 3.

TABLE 3

| | | Unit | Example 5 | Example 6 | Example 7 | Example 8 | Example 9 | Example 10 | Comparative Example 5 | Comparative Example 6 | Comparative Example 7 | Comparative Example 8 | Comparative Example 9 | Comparative Example 10 | Comparative Example 11 | Comparative Example 12 | Comparative Example 13 |
|---|---|---|---|---|---|---|---|---|---|---|---|---|---|---|---|---|---|
| Average pore size at surface 1 | | µm | 1.7 | 0.7 | 0.7 | 1.4 | 0.8 | 1.5 | 0.4 | 1.8 | 3.3 | 0.3 | 0.8 | 0.1 | 0.3 | 0.4 | 1.8 |
| Average pore size at surface 2 | | µm | 1.8 | 0.8 | 0.9 | 1.5 | 0.8 | 1.7 | 0.5 | 1.9 | 3.4 | 0.4 | 1.1 | 4.5 | 4.0 | 1.5 | 3.3 |
| Thickness | | µm | 460 | 540 | 500 | 490 | 490 | 280 | 320 | 570 | 460 | 580 | 610 | 140 | 250 | 520 | 590 |
| Porosity | | % | 58 | 41 | 38 | 45 | 56 | 54 | 26 | 65 | 62 | 66 | 28 | 61 | 58 | 49 | 64 |
| Mode particle size | | µm | 4.7 | 5.1 | 4.6 | 5.1 | 4.8 | 5.3 | 5.2 | 5 | 4.9 | 4.6 | 2.1 | 4.9 | 4.5 | 5.1 | 5 |
| Mode particle size/Average pore size ratio | | — | 2.6 | 6.4 | 5.1 | 3.4 | 6.0 | 3.1 | 10.4 | 2.6 | 1.4 | 11.5 | 1.9 | 1.1 | 1.1 | 3.4 | 1.5 |
| Cell voltage (After 24 hr) | | V | 1.81 | 1.84 | 1.84 | 1.82 | 1.90 | 1.83 | 1.99 | 1.86 | 1.84 | 2.06 | 1.85 | 1.95 | 1.86 | 1.91 | 1.86 |
| Contact angle (Before electrolysis) | | deg | 44.1 | 43.4 | 39.9 | 38.7 | 40.1 | 39.4 | 37.5 | 39.6 | 38.8 | 37.9 | 86.6 | 43.3 | 39.7 | 39.7 | 38.6 |
| Contact angle (After 24 hr) | | deg | 45.2 | 43.6 | 40.5 | 41.5 | 40.5 | 40.2 | 38.1 | 42.5 | 46.7 | 38.2 | 86.7 | 79.5 | 74.5 | 43.4 | 44.4 |
| Hydrophilicity evaluation | | deg | 1.1 | 0.2 | 0.6 | 2.8 | 0.4 | 0.8 | 0.6 | 2.9 | 7.9 | 0.3 | 0.1 | 36.2 | 34.8 | 3.7 | 5.8 |
| Tensile breaking strength | | N | 98/98 | 100/99 | 98/95 | 97/100 | 90/92 | 88/85 | 95/92 | 98/102 | 95/94 | 96/99 | 94/104 | 10/8 | 11/10 | 101/103 | 98/100 |
| Tearing strength | | N | 38/39 | 40/38 | 38/38 | 39/41 | 42/39 | 35/33 | 44/43 | 40/38 | 39/40 | 41/44 | 34/43 | 5/8 | 6/6 | 39/44 | 43/45 |
| Gas impermeability | | — | C | B | A | B | C | B | B | D | E | B | C | C | E | B | D |
| Average water permeation pore size | | µm | 0.6 | 0.5 | 0.4 | 0.7 | 0.4 | 0.6 | 0.3 | 0.5 | 0.8 | 0.3 | 0.5 | 1.0 | 1.3 | 0.7 | 0.8 |
| Cavitation test | Maximum pore size | µm | 1.8 | 1.1 | 1.1 | 1.6 | 1.2 | 1.6 | 0.9 | 2.0 | 18.0< | 0.9 | 18.0< | 18.0< | 1.8 | 1.6 | 18.0< |
| | Bubble point Before | kPa | 100 | 160 | 160 | 115 | 150 | 110 | 195 | 90 | <10 | 205 | <10 | <10 | 100 | 110 | <10 |
| | Bubble point After | kPa | 100 | 150 | 150 | 105 | 135 | 105 | 180 | 85 | <10 | 180 | <10 | <10 | <10 | 45 | <10 |
| | Abundance of hydrophilic inorganic particles (Surfaces) Before | % | 18.5 | 17.4 | 18.3 | 16.2 | 15.9 | 17.2 | 13.2 | 17.8 | 16.2 | 15.6 | — | 17.1 | 15.8 | 16.0 | 17.7 |
| | Abundance of hydrophilic inorganic particles (Surfaces) After | % | 17.7 | 15.8 | 16.7 | 14.9 | 15.1 | 15.3 | 7.6 | 5.2 | 3.8 | 5.4 | — | 5.1 | 4.8 | 6.2 | 3.7 |
| | Ratio of decrease | — | 0.04 | 0.09 | 0.09 | 0.08 | 0.05 | 0.11 | 0.42 | 0.71 | 0.77 | 0.65 | — | 0.70 | 0.70 | 0.61 | 0.79 |
| | Rating | — | A | A | A | A | A | B | C | C | C | C | — | C | C | C | C |
| | Abundance of hydrophilic inorganic particles (Cross-section) Before | % | 19.0 | 18.2 | 17.9 | 17.2 | 17.5 | 19.1 | 15.3 | 18.2 | 17.1 | 16.3 | <10 | 17.5 | 16.3 | 16.8 | 18.9 |
| | Abundance of hydrophilic inorganic particles (Cross-section) After | % | 17.5 | 16.2 | 16.5 | 15.6 | 15.7 | 16.7 | 8.3 | 9.0 | 7.2 | 8.7 | <10 | 6.5 | 7.8 | 7.9 | 8.5 |
| | Ratio of decrease | — | 0.08 | 0.11 | 0.08 | 0.09 | 0.10 | 0.13 | 0.46 | 0.51 | 0.58 | 0.47 | — | 0.63 | 0.52 | 0.53 | 0.55 |
| | Rating | — | A | B | A | A | B | B | C | C | C | C | — | C | C | C | C |
| Variable current test | Bubble point Before | kPa | 105 | 160 | 160 | 115 | 150 | 110 | 195 | 90 | <10 | 205 | <10 | <10 | 100 | 110 | <10 |
| | Bubble point After | kPa | 100 | 145 | 150 | 110 | 140 | 110 | 170 | 50 | <10 | 190 | <10 | <10 | <10 | 40 | <10 |
| | Abundance of hydrophilic inorganic particles (Surfaces) Before | % | 18.5 | 17.4 | 18.3 | 16.2 | 15.9 | 17.2 | 13.2 | 17.8 | 16.2 | 15.6 | — | 17.1 | 15.8 | 16.0 | 17.7 |
| | Abundance of hydrophilic inorganic particles (Surfaces) After | % | 17.5 | 15.6 | 16.8 | 14.7 | 15.3 | 15.7 | 5.5 | 6.0 | 3.2 | 3.4 | — | 1.7 | 4.4 | 3.7 | 2.2 |
| | Ratio of decrease | — | 0.05 | 0.10 | 0.08 | 0.09 | 0.04 | 0.09 | 0.58 | 0.66 | 0.80 | 0.78 | — | 0.90 | 0.72 | 0.77 | 0.88 |
| | Rating | — | A | B | A | A | A | A | C | C | C | C | — | C | C | C | C |
| | Abundance of hydrophilic inorganic particles (Cross-section) Before | % | 19.0 | 18.2 | 17.9 | 17.2 | 17.5 | 19.1 | 15.3 | 18.2 | 17.1 | 16.3 | <10 | 17.5 | 16.3 | 16.8 | 18.9 |
| | Abundance of hydrophilic inorganic particles (Cross-section) After | % | 17.3 | 16.4 | 16.2 | 15.4 | 16.0 | 16.2 | 8.5 | 8.6 | 7.7 | 8.2 | <10 | 7.0 | 7.4 | 8.0 | 7.4 |
| | Ratio of decrease | — | 0.09 | 0.10 | 0.09 | 0.10 | 0.09 | 0.15 | 0.44 | 0.53 | 0.55 | 0.50 | — | 0.60 | 0.55 | 0.52 | 0.61 |
| | Rating | — | A | B | A | B | A | B | C | C | C | C | — | C | C | C | C |

TABLE 4

| | | Unit | Example 5 | Example 6 | Example 7 | Example 8 | Example 9 | Example 10 | Comparative Example 5 | Comparative Example 6 | Comparative Example 7 | Comparative Example 8 | Comparative Example 9 | Comparative Example 10 | Comparative Example 11 | Comparative Example 12 | Comparative Example 13 |
|---|---|---|---|---|---|---|---|---|---|---|---|---|---|---|---|---|---|
| Composition of coating liquid | Polymer resin | — | PPSF | PES | PSF | PSF | PSF | PES | PSF | PSF | PSF | PSF | PSF | PSF | (1) PSF | (1) (2) PSF | PSF/PSF |
| | | Parts by mass | 15 | 15 | 15 | 15 | 15 | 15 | 15 | 15 | 15 | 15 | 15 | 15 | (1) 15 | (1) 15 (2) 15 | (1) 15 (2) 15 |
| | PVP | Parts by mass | 6 | 6 | 6 | 6 | 6 | 6 | 0 | 6 | 6 | 6 | 6 | 6 | (1) 6 | (1) 0 (2) 6 | (1) 6 (2) 10 |
| | NMP | Parts by mass | 70 | 70 | 70 | 70 | 70 | 70 | 60 | 70 | 70 | 70 | 70 | 70 | (1) 70 | (1) 70 (2) 70 | (1) 70 (2) 70 |
| | | — | EP | EP | EP | EP | EP | EP | EP | EP | EP | EP | — | EP | EP | EP | EP |
| | $ZrO_2$ (Grade) | Parts by mass | 45 | 45 | 45 | 45 | 45 | 45 | 30 | 45 | 45 | 45 | 0 | 45 | (1) 45 | (1) (2) 45/45 | (1) (2) 45/45 |
| Coagulation bath | Proportion (Composition) | — | H2O/NMP | H2O/NMP | H2O/NMP | H2O/NMP | H2O/NMP | H2O/NMP | H2O/NMP | H2O/NMP | H2O/NMP | H2O | H2O/IPA | H2O | H2O | H2O/NMP | H2O/NMP |
| | | v/v | 50/50 | 50/50 | 70/30 | 30/70 | 75/25 | 50/50 | 70/30 | 50/50 | 25/75 | 100 | 50/50 | 100 | (1) 100 | (1) (2) 50/50 | (1) (2) 50/50 |
| | Temperature | °C. | 38.2 | 39.4 | 39.1 | 39.2 | 42.2 | 42.2 | 23.2 | 48.8 | 39.5 | 60.3 | 38.7 | 59.7 | (1) 38.7 | (1) 40.1 (2) 39.9 | (1) 40.1 (2) 39.9 |
| Coating thickness | | μm | 100 | 100 | 100 | 100 | 150 | 50 | 50 | 150 | 150 | 150 | 150 | 150 | (1) 200 | (1) 100 (2) 50 | (1) 100 (2) 50 |
| Vapor exposure time | | min | 2.0 | 2.0 | 2.0 | 2.0 | 2.0 | 2.0 | 4.0 | 0.5 | 2.0 | 2.0 | 1.0 | 1.0 | (1) 2.0 | (1) (2) 2.0 | (1) (2) 2.0 |
| Coagulation bath immersion time | | min | 4.0 | 4.0 | 4.0 | 4.0 | 4.0 | 4.0 | 2.0 | 5.0 | 5.0 | 4.0 | 4.0 | 3.0 | (1) 4.0 | (1) (2) 4.0 | (1) (2) 4.0 |

Example 11

An amount of 30 g of zirconium oxide ("EP zirconium oxide" available from DAIICHI KIGENSO KAGAKU KOGYO, CO., LTD.), 50 g of dioctyl phthalate (available from Wako Pure Chemical Industries, Ltd. and referred to as "DOP" hereinafter), and polyethersulfone ("Veradel 3200"™, available from Solvay Advanced Polymers L.L.C.) were kneaded by a 200° C.-heated plast mill ("50MR" available from Toyo Seiki Seisaku-sho, Ltd.) at a rotation speed of 50 rpm for 10 minutes. Next, the kneaded product obtained was placed in an opening of SUS spacer having a shape of 9-cm-square and a thickness of 1 mm, pre-heated by hot pressing at 200° C. for 3 minutes, and then shaped by compression for 5 minutes. The shaped kneaded product was immediately cooled by hot pressing at 50° C. to obtain a press-shaped product. The shaped product obtained was immersed in isopropanol (available from Wako Pure Chemical Industries, Ltd.) for 24 hours to extract DOP. After the extraction, the shaped product was dried and then stretched longitudinally and transversely by a factor of four times in area using a biaxial stretching machine ("IMC-1907" available from IMOTO MACHINERY CO., LTD.) set at 90° C. In this manner, a diaphragm for alkaline water electrolysis including a porous polymer membrane was obtained. The details of the coating composition and membrane production conditions are shown in Table 6. The results of various measurements performed for the obtained porous polymer membrane are shown in Table 5.

Example 12 and Comparative Examples 13 and 14

Diaphragms for alkaline water electrolysis each including a porous polymer membrane were fabricated in the same manner as in Example 11 according to the compositions and membrane production conditions which are shown in Table 6. The results of various measurements performed for the porous polymer membranes are shown in Table 5.

TABLE 5

| | Unit | Example 11 | Example 12 | Comparative Example 14 | Comparative Example 15 |
|---|---|---|---|---|---|
| Average pore size at surface 1 | μm | 0.8 | 1.9 | 0.9 | 3.4 |
| Average pore size at surface 2 | μm | 0.9 | 2 | 1.2 | 3.9 |
| Thickness | μm | 260 | 270 | 240 | 250 |
| Porosity | % | 56 | 46 | 62 | 55 |
| Mode particle size | μm | 3.5 | 4.1 | N.A. | N.A. |
| Mode particle size/Average pore size ratio | — | 3.9 | 2.1 | N.A. | N.A. |
| Cell voltage (After 24 hr) | V | 1.83 | 1.85 | 2.05 | 2.13 |
| Contact angle (Before electrolysis) | deg | 43.5 | 41.2 | 106.5 | 110.1 |
| Contact angle (After 24 hr) | deg | 45.4 | 42.7 | 105.6 | 106.6 |
| Hydrophilicity evaluation | deg | 1.9 | 1.5 | −0.9 | −3.5 |
| Gas impermeability | — | A | C | E | E |

TABLE 5-continued

|  |  |  | Unit | Example 11 | Example 12 | Comparative Example 14 | Comparative Example 15 |
|---|---|---|---|---|---|---|---|
| Average water permeation pore size | | | μm | 0.4 | 0.6 | 0.5 | 0.8 |
| Maximum pore size | | | μm | 1.1 | 1.7 | 18.0< | 18.0< |
| Cavitation test | Bubble point | Before | kPa | 160 | 105 | <10 | <10 |
| | | After | kPa | 150 | 100 | <10 | <10 |
| | Abundance of hydrophilic inorganic particles (Surfaces) | Before | % | 15.2 | 14.4 | — | — |
| | | After | % | 13.7 | 12.5 | — | — |
| | | Ratio of decrease | — | 0.10 | 0.13 | — | — |
| | | Rating | — | B | B | — | — |
| | Abundance of hydrophilic inorganic particles (Cross-section) | Before | % | 17.6 | 18.4 | — | — |
| | | After | % | 16.0 | 15.8 | — | — |
| | | Ratio of decrease | — | 0.09 | 0.14 | — | — |
| | | Rating | — | A | B | — | — |
| Variable current test | Bubble point | Before | kPa | 160 | 105 | <10 | <10 |
| | | After | kPa | 145 | 105 | <10 | <10 |
| | Abundance of hydrophilic inorganic particles (Surfaces) | Before | % | 15.2 | 14.4 | — | — |
| | | After | % | 14.0 | 12.3 | — | — |
| | | Ratio of decrease | — | 0.08 | 0.15 | — | — |
| | | Rating | — | A | B | — | — |
| | Abundance of hydrophilic inorganic particles (Cross-section) | Before | % | 17.6 | 18.4 | — | — |
| | | After | % | 16.6 | 15.3 | — | — |
| | | Ratio of decrease | — | 0.06 | 0.17 | — | — |
| | | Rating | — | A | B | — | — |

TABLE 6

|  |  | Unit | Example 11 | Example 12 | Comparative Example 14 | Comparative Example 15 |
|---|---|---|---|---|---|---|
| Coating liquid | Polymer resin | — | PES | PPSF | PES | PPSF |
| | | Parts by mass | 38 | 15 | 35 | 35 |
| | Plasticizer | — | DOP | DOP | DOP | DOP |
| | | Parts by mass | 70 | 70 | 65 | 65 |
| | ZrO$_2$ (Grade) | — | EP | EP | — | — |
| | | Parts by mass | 45 | 45 | 0 | 0 |
| | Mixing temperature | °C. | 200 | 200 | 200 | 200 |
| Membrane production | Thickness | μm | 1000 | 1000 | 1000 | 1000 |
| | Press temperature for heating | °C. | 200 | 200 | 200 | 200 |
| | Press temperature for cooling | °C. | 50 | 50 | 50 | 50 |
| Stretching | Ratio (MD × TD) | Times | 2 × 2 | 2 × 2 | 2 × 2 | 2 × 2 |
| | Temperature | °C. | 90 | 80 | 90 | 80 |

Example 13

In a 1 L ball mill, 30 g of zirconium oxide ("EP zirconium oxide" available from DAIICHI KIGENSO KAGAKU KOGYO, CO., LTD.) was crushed and mixed with 120 g of liquid paraffin (available from Matsumura Oil Research Corporation) and high-density polyethylene (having a density of 0.95 and a viscosity-average molecular weight of 250000). The mixture obtained was placed in an opening of a SUS spacer having a shape of 9-cm-square and a thickness of 1 mm, pre-heated by hot pressing at 120° C. for 3 minutes, and then shaped by compression for 5 minutes. The shaped kneaded product was immediately cooled by hot pressing at 100° C. to obtain a press-shaped product. The shaped product obtained was immersed in isopropanol (available from Wako Pure Chemical Industries, Ltd.) for 24 hours to extract DOP. After the extraction, the shaped product was dried and then stretched longitudinally and transversely by a factor of four times in area using a biaxial stretching machine ("IMC-1907" available from IMOTO MACHINERY CO., LTD.) set at 120° C. In this manner, a diaphragm for alkaline water electrolysis including a porous polymer membrane was obtained. The details of the coating composition and membrane production conditions are shown in Table 8. The results of various measurements performed for the obtained porous polymer membrane are shown in Table 7.

Example 14 and Comparative Examples 15 and 16

Diaphragms for alkaline water electrolysis each including a porous polymer membrane were fabricated in the same manner as in Example 13 according to the compositions and membrane production conditions which are shown in Table 8. The results of various measurements performed for the porous polymer membranes are shown in Table 7.

TABLE 7

| | | Unit | Example 13 | Example 14 | Comparative Example 16 | Comparative Example 17 |
|---|---|---|---|---|---|---|
| Average pore size at surface 1 | | μm | 0.8 | 1.5 | 2.7 | 2.5 |
| Average pore size at surface 2 | | μm | 1.0 | 1.7 | 2.8 | 2.8 |
| Thickness | | μm | 260 | 240 | 270 | 260 |
| Porosity | | % | 43 | 46 | 49 | 47 |
| Mode particle size | | μm | 3.3 | 3.4 | N.A. | N.A. |
| Mode particle size/Average pore size ratio | | — | 3.3 | 2.0 | N.A. | N.A. |
| Cell voltage (After 24 hr) | | V | 1.82 | 1.86 | 2.19 | 2.13 |
| Contact angle (Before electrolysis) | | deg | 39.9 | 42.2 | 95.2 | 93.7 |
| Contact angle (After 24 hr) | | deg | 40.6 | 45.3 | 94.5 | 92.2 |
| Hydrophilicity evaluation | | deg | 0.7 | 3.1 | −0.7 | −1.5 |
| Gas impermeability | | — | B | B | E | E |
| Average water permeation pore size | | μm | 0.4 | 0.5 | 0.7 | 0.6 |
| Maximum pore size | | μm | 1.3 | 1.6 | 18.0< | 18.0< |
| Cavitation test | Bubble point Before | kPa | 135 | 115 | <10 | <10 |
| | Bubble point After | kPa | 120 | 110 | <10 | <10 |
| | Abundance of hydrophilic inorganic particles (Surfaces) Before | % | 13.1 | 14.0 | — | — |
| | Abundance of hydrophilic inorganic particles (Surfaces) After | % | 11.9 | 13.2 | — | — |
| | Ratio of decrease | — | 0.09 | 0.06 | — | — |
| | Rating | — | A | A | — | — |
| | Abundance of hydrophilic inorganic particles (Cross-section) Before | % | 14.5 | 14.1 | — | — |
| | Abundance of hydrophilic inorganic particles (Cross-section) After | % | 13.1 | 12.3 | — | — |
| | Ratio of decrease | — | 0.10 | 0.13 | — | — |
| | Rating | — | B | B | — | — |
| Variable current test | Bubble point Before | kPa | 135 | 115 | <10 | <10 |
| | Bubble point After | kPa | 125 | 110 | <10 | <10 |
| | Abundance of hydrophilic inorganic particles (Surfaces) Before | % | 13.1 | 14.0 | — | — |
| | Abundance of hydrophilic inorganic particles (Surfaces) After | % | 12.0 | 12.9 | — | — |
| | Ratio of decrease | — | 0.08 | 0.08 | — | — |
| | Rating | — | A | A | — | — |
| | Abundance of hydrophilic inorganic particles (Cross-section) Before | % | 14.5 | 14.1 | — | — |
| | Abundance of hydrophilic inorganic particles (Cross-section) After | % | 13.4 | 12.1 | — | — |
| | Ratio of decrease | — | 0.08 | 0.14 | — | — |
| | Rating | — | A | B | — | — |

TABLE 8

| | | Unit | Example 13 | Example 14 | Comparative Example 16 | Comparative Example 17 |
|---|---|---|---|---|---|---|
| Mixture | Polymer resin | — | PE | PP | PE | PP |
| | | Parts by mass | 10 | 10 | 10 | 10 |
| | Lubricant | — | Liquid paraffin | Liquid paraffin | Liquid paraffin | Liquid paraffin |
| | | Parts by mass | 40 | 40 | 40 | 40 |
| | ZrO$_2$ (Grade) | — | EP | EP | — | — |
| | | Parts by mass | 10 | 10 | 0 | 0 |
| Membrane production | Thickness | μm | 1000 | 1000 | 1000 | 1000 |
| | Membrane production temperature | °C. | 100 | 100 | 100 | 100 |
| | Ratio | Times | 2 × 2 | 2 × 2 | 2 × 2 | 2 × 2 |

TABLE 8-continued

|  | Unit | Example 13 | Example 14 | Comparative Example 16 | Comparative Example 17 |
|---|---|---|---|---|---|
| Stretching (MD × TD) Temperature | ° C. | 120 | 120 | 120 | 120 |

The present application is based on Japanese Patent Application (Japanese Patent Application No. 2015-054517) filed with Japan Patent Office on Mar. 18, 2015, all the contents of which are herein incorporated by reference.

INDUSTRIAL APPLICABILITY

The present invention can provide: a diaphragm for alkaline water electrolysis that is capable, in long-term electrolysis, of keeping hydrophilic inorganic particles from detachment from pores in the surfaces of a porous polymer membrane, thus maintaining hydrophilicity and being free from deterioration of ion permeability caused by bubble attachment; an alkaline water electrolysis device; and a method for producing a diaphragm for alkaline water electrolysis. The present invention can be used in a wide variety of applications such as water electrolysis process.

REFERENCE SIGNS LIST

1 . . . Cathode compartment,
2 . . . Anode compartment,
3 . . . Diaphragm for alkaline water electrolysis,
10 . . . Electrolytic cell,
11 . . . Cathode,
12 . . . Cathode tank,
21 . . . Anode,
22 . . . Anode tank,
30 . . . Electrolyte solution feed line,
40 . . . Pump

The invention claimed is:

1. A diaphragm for alkaline water electrolysis, comprising a porous polymer membrane, the porous polymer membrane comprising a polymer resin and hydrophilic inorganic particles, wherein
   a porosity of the porous polymer membrane is in a range of 30% to 55%,
   average pore sizes at both surfaces of the porous polymer membrane are in a range of 0.5 μm to 2.0 μm, and
   a ratio of a mode particle size of the hydrophilic inorganic particles to the average pore size of the porous polymer membrane (mode particle size/average pore size) is in a range of 3.1 to 7.0.

2. The diaphragm for alkaline water electrolysis according to claim 1, wherein the polymer resin comprises at least one selected from the group consisting of polysulfone, polyethersulfone, and polyphenylsulfone.

3. The diaphragm for alkaline water electrolysis according to claim 1, wherein a thickness of the porous polymer membrane is in a range of 300 μm to 600 μm.

4. The diaphragm for alkaline water electrolysis according to claim 1, wherein the hydrophilic inorganic particles comprise zirconium oxide.

5. The diaphragm for alkaline water electrolysis according to claim 1, further comprising a porous support.

6. The diaphragm for alkaline water electrolysis according to claim 5, wherein the porous support is any one selected from the group consisting of a mesh, a non-woven fabric, a woven fabric, and a composite fabric comprising a non-woven fabric and a woven fabric enclosed in the non-woven fabric.

7. The diaphragm for alkaline water electrolysis according to claim 6, wherein the porous support comprises polyphenylene sulfide.

8. An alkaline water electrolysis device comprising:
   an anode;
   a cathode; and
   the diaphragm for alkaline water electrolysis according to claim 1, the diaphragm being placed between the anode and the cathode.

9. A method for producing hydrogen, comprising-electrolyzing alkaline water by applying a voltage to the alkaline water electrolysis device according to claim 8 using a variable power supply.

10. A method for producing the diaphragm for alkaline water electrolysis according to claim 1, comprising:
   (A) preparing a solution containing the polymer resin, a solvent capable of dissolving the polymer resin, and the hydrophilic inorganic particles;
   (B) applying the solution to a substrate to form a coating on the substrate;
   (C) exposing a surface of the coating, said surface being located opposite from the substrate, to a gas containing vapor of a poor solvent for the polymer resin; and
   (D) immersing the coating on the substrate in a coagulation bath containing the poor solvent for the polymer resin to form a porous polymer membrane.

11. The method for producing the diaphragm for alkaline water electrolysis according to claim 10, wherein the poor solvent in the coagulation bath further comprises the solvent.

12. The method for producing the diaphragm for alkaline water electrolysis according to claim 11, wherein a concentration of the solvent in the coagulation bath is from 30 to 70 mass %.

13. The method for producing the diaphragm for alkaline water electrolysis according to claim 12, wherein the solvent comprises N-methyl-2-pyrrolidone.

14. A method for producing the diaphragm for alkaline water electrolysis according to claim 1, comprising:
   (E) mixing the polymer resin, a solvent capable of dissolving the polymer resin, and the hydrophilic inorganic particles to obtain a homogeneous dispersion, at a temperature higher than a phase separation temperature of the dispersion to be obtained;
   (F) extruding the dispersion at a temperature higher than the phase separation temperature of the dispersion to obtain an extrudate;
   (G) cooling the extrudate obtained in (F) to a temperature equal to or lower than the phase separation temperature of the dispersion to coagulate the extrudate; and
   (H) extracting the solvent from the extrudate obtained in (G) to obtain a porous polymer membrane.

15. The method for producing the diaphragm for alkaline water electrolysis according to claim 14, further comprising stretching.

16. A method for producing the diaphragm for alkaline water electrolysis according to claim 1, comprising:
- (I) paste-extruding a mixture containing a polymer resin and hydrophilic inorganic particles;
- (J) rolling the extruded paste to obtain a sheet-shaped porous membrane; and
- (K) stretching the obtained sheet-shaped porous membrane in a longitudinal direction and/or a transverse direction.

* * * * *